US010780906B2

(12) United States Patent
Takyar et al.

(10) Patent No.: US 10,780,906 B2
(45) Date of Patent: Sep. 22, 2020

(54) DOLLY FOR TRANSPORTING PRODUCTS

(71) Applicant: CHEP Technology Pty Limited, Sydney (AU)

(72) Inventors: Sanjiv Takyar, Weybridge (GB); Karl Michael Wesson, Weybridge (GB); Andy Cope, Leopoldsburg (BE)

(73) Assignee: CHEP Technology Pty Limited, Sydney (AU)

(*) Notice: Subject to any disclaimer, the term of this patent is extended or adjusted under 35 U.S.C. 154(b) by 0 days.

(21) Appl. No.: 16/071,982

(22) PCT Filed: Jan. 30, 2017

(86) PCT No.: PCT/IB2017/050475
§ 371 (c)(1),
(2) Date: Jul. 23, 2018

(87) PCT Pub. No.: WO2017/130167
PCT Pub. Date: Aug. 3, 2017

(65) Prior Publication Data
US 2019/0031222 A1    Jan. 31, 2019

(30) Foreign Application Priority Data

Jan. 28, 2016  (GB) .................................. 1601616.4
Jan. 29, 2016  (GB) .................................. 1601705.5
Sep. 12, 2016  (GB) .................................. 1615479.1

(51) Int. Cl.
*B62B 3/16*     (2006.01)
*B65D 19/42*    (2006.01)
(Continued)

(52) U.S. Cl.
CPC ............... *B62B 3/16* (2013.01); *B60B 33/00* (2013.01); *B60B 33/006* (2013.01);
(Continued)

(58) Field of Classification Search
CPC ......... B62B 3/16; B62B 3/1492; B65D 19/44; B65D 19/42; B65D 2519/00781; B60B 33/00; B60B 33/006
(Continued)

(56) References Cited

U.S. PATENT DOCUMENTS 2,775,313 A    12/1956   Kurvers
3,404,642 A    10/1968   Belcher
(Continued)

FOREIGN PATENT DOCUMENTS

AU         4912472       5/1974
AU         313192        3/2007
(Continued)

*Primary Examiner* — Jose V Chen
(74) *Attorney, Agent, or Firm* — Allen, Dyer, Doppelt + Gilchrist, PA

(57) ABSTRACT

A dolly for transporting products thereon, the dolly comprising a top with a product support surface and an opposing underside, a plurality of casters provided on the underside, two of the casters being swivel casters configured to rotate relative to the product support surface; biasing means configured to bias a wheel of each swivel caster towards a first equilibrium position. A plurality of reinforcing ribs provided on the underside; wherein at least one of the reinforcing ribs is a curved reinforcing rib, and; the at least one curved reinforcing rib extends from a first caster mounting area to a second caster mounting area. Further including, a dolly carrier pallet comprising a pallet provided with a dolly receiving layer, wherein the dolly receiving layer is provided with generally rectangular wheel receiving recesses for receiving swivel casters and is provided with generally rectangular wheel receiving recesses for receiving fixed casters.

18 Claims, 24 Drawing Sheets

(51) Int. Cl.
  *B65D 19/44* (2006.01)
  *B62B 5/00* (2006.01)
  *B60B 33/00* (2006.01)
  *B62B 3/14* (2006.01)
  *B65D 19/00* (2006.01)
  *B60B 33/02* (2006.01)

(52) U.S. Cl.
  CPC .............. *B62B 3/1492* (2013.01); *B62B 5/00* (2013.01); *B65D 19/0095* (2013.01); *B65D 19/42* (2013.01); *B65D 19/44* (2013.01); *B60B 33/0068* (2013.01); *B60B 33/028* (2013.01); *B60B 2900/325* (2013.01); *B60B 2900/551* (2013.01); *B62B 2203/60* (2013.01); *B62B 2301/0465* (2013.01); *B62B 2301/254* (2013.01); *B62B 2501/065* (2013.01); *B65D 2519/00034* (2013.01); *B65D 2519/00064* (2013.01); *B65D 2519/00273* (2013.01); *B65D 2519/00293* (2013.01); *B65D 2519/00323* (2013.01); *B65D 2519/00333* (2013.01); *B65D 2519/00781* (2013.01); *B65D 2519/00815* (2013.01)

(58) Field of Classification Search
  USPC .......................... 108/57.25, 53.3, 55.3, 53.1
  See application file for complete search history.

(56) References Cited

U.S. PATENT DOCUMENTS

| | | | |
|---|---|---|---|
| 3,648,883 A | | 3/1972 | Bridenstine |
| 3,750,598 A | | 8/1973 | Campbell et al. |
| 3,757,704 A | | 9/1973 | Allgeyer et al. |
| 3,814,031 A | | 6/1974 | Fowler |
| 3,951,078 A | | 4/1976 | Fowler et al. |
| 3,962,660 A | * | 6/1976 | Duckett ................ H01F 27/002 336/65 |
| 4,037,291 A | * | 7/1977 | Huempfner ............. B60B 33/02 16/35 R |
| 4,212,093 A | | 7/1980 | Lombard |
| 4,674,414 A | | 6/1987 | Nulle et al. |
| 5,644,991 A | * | 7/1997 | Prevot .................... B65D 19/40 108/54.1 |
| 5,711,540 A | * | 1/1998 | Nesting ..................... B62B 3/16 280/33.998 |
| D427,406 S | * | 6/2000 | Hartwall ........................ D34/12 |
| 6,126,131 A | * | 10/2000 | Tietz ........................ B25H 3/00 108/55.3 |
| D437,669 S | * | 2/2001 | Blason ........................... D34/23 |
| 6,234,088 B1 | | 5/2001 | Bredal et al. |
| 6,257,152 B1 | * | 7/2001 | Liu .......................... B62B 3/16 108/53.3 |
| 6,886,787 B2 | * | 5/2005 | Stahl .................... B62B 3/1476 206/508 |
| 6,979,005 B1 | | 12/2005 | McLerran |
| 7,766,348 B2 | * | 8/2010 | McFarland ............... A47F 5/11 108/52.1 |
| 8,146,203 B2 | | 4/2012 | Pollard |
| 8,511,239 B2 | * | 8/2013 | Lin .................... B65D 19/0038 108/53.1 |
| 8,740,228 B2 | * | 6/2014 | Patterson ................. B62B 3/16 206/503 |
| 8,875,894 B2 | * | 11/2014 | Ness ........................ B65G 1/02 108/55.3 |
| 9,016,653 B1 | | 4/2015 | Cox, Jr. et al. |
| 9,045,253 B2 | | 6/2015 | Hacko et al. |
| 9,114,819 B2 | * | 8/2015 | Tiilikainen ............... B62B 3/16 |
| 9,174,766 B2 | | 11/2015 | Kosonen et al. |
| 9,421,835 B2 | * | 8/2016 | Kao ......................... B60D 1/04 |
| 9,433,151 B2 | * | 9/2016 | Ziembicki .......... B60B 33/0039 |
| 9,573,421 B2 | * | 2/2017 | Tiilikainen .......... B60B 33/0005 |
| D828,671 S | * | 9/2018 | Cope ............................. D34/23 |
| 2003/0089285 A1 | | 5/2003 | Carson |
| 2003/0205877 A1 | * | 11/2003 | Verna ........................ B65D 1/38 280/79.11 |
| 2003/0209171 A1 | * | 11/2003 | Milles ................ B65D 19/0018 108/53.1 |
| 2005/0006861 A1 | | 1/2005 | Dubois et al. |
| 2005/0151336 A1 | * | 7/2005 | Neuman .................. B62B 3/02 280/79.11 |
| 2006/0103094 A1 | | 5/2006 | Wiff et al. |
| 2007/0170676 A1 | | 7/2007 | Hilditch |
| 2008/0296183 A1 | | 12/2008 | Meers |
| 2010/0074721 A1 | | 3/2010 | Meers |
| 2014/0033956 A1 | * | 2/2014 | Kelly ...................... B62B 3/005 108/50.11 |
| 2014/0238278 A1 | | 8/2014 | Nepper et al. |

FOREIGN PATENT DOCUMENTS

| | | |
|---|---|---|
| AU | 316044 | 9/2007 |
| BM | 8401825 | 3/2006 |
| CA | 955861 | 10/1974 |
| CA | 1226533 | 9/1987 |
| CN | 101028875 | 9/2007 |
| CN | 201457860 | 5/2010 |
| CN | 204078296 | 1/2015 |
| CN | 206562028 | 10/2017 |
| DE | 2213333 | 10/1973 |
| DE | 3217573 | 11/1983 |
| DE | 19939286 | 2/2001 |
| DE | 10201282 | 7/2003 |
| DE | 10209562 | 9/2003 |
| DE | 202004015972 | 1/2005 |
| DE | 10332421 | 2/2005 |
| DE | 20 2010 013 118 | 4/2011 |
| DE | 40100902-0001 | 10/2016 |
| EM | 000560842-0002 | 7/2006 |
| EM | 000645692-0001 | 12/2006 |
| EM | 000560842-001 | 8/2008 |
| EM | 001886102-0001 | 4/2011 |
| EM | 002551705-0001 | 4/2011 |
| EM | 002551705-0003 | 6/2014 |
| EM | 002551705-0008 | 6/2014 |
| EP | 0804358 | 7/1999 |
| EP | 1072494 | 1/2000 |
| EP | 1149753 | 4/2001 |
| EP | 1165385 | 1/2002 |
| EP | 1663758 | 9/2004 |
| EP | 1529733 | 12/2004 |
| EP | 1529733 | 5/2005 |
| EP | 1731398 | 3/2006 |
| EP | 2017189 | 1/2009 |
| EP | 2431253 | 9/2011 |
| EP | 2423071 | 2/2012 |
| EP | 2431253 | 3/2012 |
| EP | 2671814 | 11/2013 |
| EP | 1495937 | 1/2015 |
| EP | 2878549 | 6/2015 |
| EP | 2930121 | 10/2015 |
| EP | 3006303 | 4/2016 |
| EP | 1997742 | 12/2018 |
| FR | 2766149 | 7/1997 |
| FR | 2759049 | 7/1998 |
| FR | 2759049 | 8/1998 |
| FR | 2766149 | 1/1999 |
| FR | 985825 | 3/1999 |
| FR | 994289 | 10/1999 |
| FR | 2872475 | 1/2006 |
| FR | 2927843 | 2/2008 |
| FR | 096403 | 3/2010 |
| GB | 781698 | 8/1957 |
| GB | 904198 | 8/1962 |
| GB | 2280166 | 1/1995 |
| GB | 2281897 | 3/1995 |
| GB | D2098902 | 7/2000 |
| GB | 2354436 | 3/2001 |
| GB | 2102929 | 6/2001 |
| GB | 2389101 | 12/2003 |
| GB | 2465398 | 5/2010 |

(56) References Cited

FOREIGN PATENT DOCUMENTS

| | | |
|---|---:|---|
| GB | 2425999 | 11/2016 |
| JP | 49002254 | 1/1974 |
| JP | 6-156493 | 6/1994 |
| JP | 06336250 | 12/1994 |
| JP | 8-026279 | 1/1996 |
| JP | 11-208481 | 8/1999 |
| JP | 2002225866 | 8/2002 |
| JP | 2006021555 | 1/2006 |
| JP | 2011219150 | 11/2011 |
| JP | 3210654 | 5/2017 |
| KR | 101391219 | 4/2014 |
| NL | 1026954 | 3/2006 |
| WO | WO DM/013738 | 8/1989 |
| WO | WO9842523 | 10/1998 |
| WO | WO9957025 | 11/1999 |
| WO | WO02090199 | 11/2002 |
| WO | WO 2006080857 | 3/2006 |
| WO | WO 2009016339 | 2/2009 |
| WO | WO 2014022498 | 2/2014 |
| WO | WO 2017130167 | 3/2017 |

\* cited by examiner

DOLLY FOR TRANSPORTING PRODUCTS

TECHNICAL FIELD

The present invention relates to a dolly and to a dolly carrier pallet for carrying dollies.

BACKGROUND

Pallets for distributing products from one location to another are well known and they can be provided in a number of different sizes. Rectangular plan dimensions of load bearing platforms (commonly known as pallets) including but not limited to those that conform to ISO 6780:2003 (E) have lengths and widths of 1200×800 mm (commonly known as Euro size), 1200×1000 mm (commonly known as full size), and 1219×1016 mm. The term "half pallet" is half of the size of the standard pallet according to the particular standard being used. Similarly, the term "quarter pallet" is a quarter of the size of the standard pallet according to the particular standard being used. For example, if the standard used in one region is 1200×800 mm, then a half pallet will have dimensions of 800×600 mm, and a quarter pallet will have dimensions of 600×400 mm. These standard dimensions are also applied to wheeled platforms commonly known as dollys, and also referred to as pallets on wheels.

It has been recognised by the present inventors that various improvements could be made to the dollys currently in use. The present invention relates to such improvements.

SUMMARY OF INVENTION

According to a first aspect of the present invention there is provided a dolly for transporting products thereon. The dolly comprises a top with a product support surface and an opposing underside. The dolly further comprises a plurality of casters provided on the underside, two of the casters being swivel casters configured to rotate relative to the product support surface; and biasing means configured to bias a wheel of each swivel caster towards a first equilibrium position.

Advantageously, by providing a biasing means according to the first aspect, the wheels of the casters can be biased towards a preferred orientation, which can help with stacking dollys. Furthermore, such a biasing means can be used to prevent unwanted swivelling of the wheels, which can lead to instability and damage of the dolly, wheels or Manual Handling Equipment.

Optionally, the biasing means may be provided by a spring. More than one spring may be used, such as two or more springs. Alternatively, any elastic material may be used as the biasing means, such as elastic rope.

Optionally, the biasing means may be configured to provide a torque to the wheel when the wheel is orientated away from the first equilibrium position. This torque may then act to bias the wheel back to the equilibrium position.

Optionally, two of the casters have a fixed orientation relative to the product support surface. Such casters may be "fixed" casters, i.e. cannot swivel.

Optionally, the dolly may further comprise an offset between a vertical swivel axis of the swivel caster and wheel rotation axis of between 30 mm and 50 mm. Such an offset may facilitate steering of the dolly.

Optionally, the first equilibrium position may be such that the wheel is orientated along a length of the dolly. That is, when in the first equilibrium position, the wheel points along an axis of the dolly. Optionally, the first equilibrium position is the only equilibrium position. That is, the no matter what orientation the wheel is in, it will be biased towards only one particular orientation.

Optionally, the biasing means may be further arranged to bias the wheel towards the first equilibrium position when the wheel is in a first orientation, and the biasing means may be further arranged to bias the wheel towards a second equilibrium position when the wheel is in a second orientation.

Optionally, the first and second equilibrium positions may be separated by 180 degrees.

Optionally, the first orientation may be an orientation of the wheel being less than 90 degrees from the first equilibrium position.

Optionally, the second orientation may be an orientation of the wheel being less than 90 degrees from the second equilibrium position.

Optionally, the dolly may further comprise a plurality of reinforcing ribs provided on the underside. At least one of the reinforcing ribs may be a curved reinforcing rib, and, the at least one curved reinforcing rib may extend from a first caster mounting area to a second caster mounting area.

Optionally, the first caster mounting area may comprise a first mounting point which receives a fixing means to affix a first caster, and the second caster mounting area may comprise a second mounting point which receives a fixing means to affix a second caster.

Optionally, the first and second mounting points may comprise first and second apertures. The apertures may, for example, be holes in the underside of the dolly.

Optionally, the fixing means may be a self-threading fastener.

Optionally, at least one curved reinforcing rib may extend between the first mounting point and the second mounting point.

Optionally, at least eight ribs may extend from at least one of the mounting points of one of the mounting areas.

Optionally the dolly may further comprise third and fourth mounting areas, and wherein each mounting area may be connected to at least two other mounting areas via at least one curved rib. That is, curved ribs may extend between each mounting area to at least two other mounting areas.

Optionally, a distance between a side of the dolly and a reinforcing rib directly adjacent to the side of the dolly may be less than an average distance between the plurality of reinforcing ribs.

Optionally, the dolly may further comprise four wheel receiving portions arranged in the product support surface, each wheel receiving portion may be configured to receive a wheel from a further dolly, wherein the depth of the wheel receiving portion may be greater than 15 mm. Optionally, the depth of the wheel receiving portion may be greater than 20 mm.

Optionally, at least one wheel receiving portion may be substantially aligned with a corresponding at least one mounting area. That is, when viewed in plan view, a wheel receiving portion lines up with its corresponding mounting area.

Optionally, there may be an offset between at least one wheel receiving portion and a corresponding at least one mounting area, the offset defining an offset area of the wheel receiving portion. The offset area may be a region of the wheel receiving portion not in alignment with its corresponding mounting area. Such an offset region may suffer from reduced structural integrity, as a mounting plate of a corresponding caster may not extend over this offset region.

Optionally, the dolly may further comprise an additional reinforcing rib, the additional reinforcing rib may be arranged to extend at least part way into the offset area of the wheel receiving portion. The additional reinforcing rib may provide further reinforcement in the offset area.

Optionally, the additional reinforcing rib has first and second ends, the first end may connect to a reinforcing rib and the second end may not connect to a reinforcing rib. That is, the additional reinforcing rib may terminate prior to reaching a further rib.

Optionally, the dolly may be a quarter dolly.

Optionally, at least one of the swivel casters comprises a brake mechanism which can be actuated in order to prevent rotation of the wheel of the at least one swivel caster.

According to a second aspect of the present invention there is provided a dolly for transporting products thereon. The dolly comprises a top with a product support surface and an opposing underside. A plurality of reinforcing ribs are provided on the underside. At least one of the reinforcing ribs is a curved reinforcing rib, and the at least one curved reinforcing rib extends from a first caster mounting area to a second caster mounting area.

Advantageously, providing at least one curved reinforcing rib extending from a first caster mounting area to a second caster mounting area provides increased rigidity of the dolly between these points.

The term "curved" refers to a rib that connects two points but not via the shortest path between those points. The curve may be continuous, or may comprise a series of straight sections separated by a series of discrete changes in angle. The discrete changes in angle may be less than 30 degrees. In another embodiment, the angle may be less than 20 degrees.

Optionally, the first caster mounting area may comprise a first mounting point which receives a fixing means to affix a first caster, and the second caster mounting area may comprise a second mounting point which receives a fixing means to affix a second caster.

Optionally, the first and second mounting points may comprise first and second apertures. The apertures may, for example, be holes in the underside of the dolly.

Optionally, the fixing means may be a self-threading fastener.

Optionally, at least one curved reinforcing rib may extend between the first mounting point and the second mounting point.

Optionally, at least eight ribs may extend from at least one of the mounting points of one of the caster mounting areas.

Optionally the dolly may further comprise third and fourth caster mounting areas, and wherein each mounting area may be connected to at least two other caster mounting areas via at least one curved rib.

Optionally, a distance between a side of the dolly and a reinforcing rib directly adjacent to the side of the dolly may be less than an average distance between the plurality of reinforcing ribs.

Optionally, the dolly may further comprise four wheel receiving portions arranged in the product support surface, each wheel receiving portion may be configured to receive a wheel from a further dolly, wherein the depth of the wheel receiving portion is greater than 15 mm. Optionally, the depth of the wheel receiving portion is greater than 20 mm.

Optionally, at least one wheel receiving portion may be substantially aligned with a corresponding at least one caster mounting area. That is, when viewed in plan view, a wheel receiving portion lines up with its corresponding caster mounting area.

Optionally, there may be an offset between at least one wheel receiving portion and a corresponding at least one caster mounting area, the offset defining an offset area of the wheel receiving portion. The offset area is a region of the wheel receiving portion not in alignment with its corresponding caster mounting area. Such an offset region may suffer from reduced structural integrity, as a mounting plate of a corresponding caster does not extend over this offset region.

Optionally, the dolly may further comprise an additional reinforcing rib, the additional reinforcing rib may be arranged to extend at least part way into the offset area of the wheel receiving portion. The additional reinforcing rib may provide further reinforcement in the offset area.

Optionally, the additional reinforcing rib has first and second ends, the first end may connect to a reinforcing rib and the second end may not connect to a reinforcing rib. That is, the additional reinforcing rib may terminate prior to reaching a further rib.

Optionally, two or more ribs may extend from a mounting point into a first quadrant, where the first quadrant has an origin located at the mounting point, and encompasses the centre of the dolly. Fewer ribs may extend from the mounting point into a second quadrant, where the second quadrant has an origin located at the mounting point, and encompasses an outer corner of the dolly.

In this way, the angles between the ribs that extend towards the centre of the dolly are generally smaller than the angles between the ribs that extend away from the centre of the dolly.

Optionally, at least one curved rib extends between a caster mounting area at one end of the quarter dolly and a caster mounting area at an opposite end of the quarter dolly. This arrangement may increase the strength of the quarter pallet. The arrangement may reduce undesirable torsional flexing of the quarter dolly (i.e. rotational flexing with respect to a line which runs from one end to an opposite end of the quarter dolly). The at least one curved rib may extend between mounting points of the caster mounting areas. Two or more curved ribs may extend between a caster mounting area at one end of the quarter dolly and a caster mounting area at an opposite end of the quarter dolly.

Optionally, the dolly is a quarter dolly.

Optionally at least one of the swivel casters comprises a brake mechanism which can be actuated in order to prevent rotation of the wheel of the at least one swivel caster.

According to a third aspect of the present invention there is provided a dolly for transporting products thereon. The dolly comprises a top with a product support surface and an opposing underside; a plurality of casters provided on the underside, and a plurality of wheel receiving portions provided on the product support surface. The depth of the wheel receiving portions is greater than 15 mm.

According to a fourth aspect of the invention there is provided a dolly carrier pallet comprising a pallet provided with a dolly receiving layer, wherein the dolly receiving layer is provided with generally rectangular wheel receiving recesses for receiving swivel casters and is provided with generally rectangular wheel receiving recesses for receiving fixed casters.

Optionally, the swivel caster wheel receiving recesses are longer than the fixed caster wheel receiving recesses.

Optionally, the swivel caster wheel receiving recesses are wider than the fixed caster wheel receiving recesses.

Optionally, the swivel caster wheel receiving recesses are at least 5 mm wider than the fixed caster wheel receiving recesses.

Optionally, the swivel caster wheel receiving recesses are located towards the centre of the dolly carrier pallet and the fixed caster wheel receiving recesses are located at ends of the dolly carrier pallet.

Optionally, the wheel receiving recesses of the dolly receiving layer are arranged to receive casters of four pallets.

Optionally, sixteen wheel receiving recesses are provided in the dolly receiving layer.

Optionally, at least some of the wheel receiving recesses have chamfered ends.

Optionally, the wheel receiving recesses have a bottom surface formed by the dolly receiving layer.

Optionally, the bottom surfaces of the wheel receiving recesses are flat.

Optionally, blocks provided at corners of the pallet have a length of at least 250 mm.

According to a fifth aspect of the invention there is provided a dolly carrier pallet of the fourth aspect of the invention, with dollies according to any of the first to third aspects of the invention located on the dolly carrier pallet.

According to a fifth aspect of the invention there is provided a combination of a dolly carrier pallet and a dolly, wherein
the dolly comprises a top with a product support surface and an opposing underside, a plurality of casters being provided on the underside, two of the casters being swivel casters configured to rotate relative to the product support surface, the dolly further comprising biasing means configured to bias a wheel of each swivel caster towards a first equilibrium position; and wherein
the dolly is located on the dolly carrier pallet, the dolly carrier pallet having a dolly receiving layer provided with generally rectangular recesses which receive the casters of the dolly.

Optionally, two of the casters of the dolly have a fixed orientation relative to the product support surface, and the recesses which receive the swivel casters are wider than the recesses which receive the fixed casters.

Optionally, two of the casters of the dolly have a fixed orientation relative to the product support surface, and the recesses which receive the swivel casters are longer than the recesses which receive the fixed casters.

Optionally, the recesses which receive the swivel casters are located towards the centre of the dolly carrier pallet and the recesses which receive the fixed casters are located at ends of the dolly carrier pallet, such that the swivel casters are located towards the centre of the dolly carrier pallet.

Optionally, there is a close fit between the fixed casters and the recesses which receive the fixed casters such that significant movement of the fixed casters along those recesses is prevented.

Optionally, the dolly carrier pallet is provided with sixteen generally rectangular recesses, each receiving a caster of a dolly such that four dollies are received by the dolly carrier pallet.

Optionally, swivel casters of the dollies are located towards the centre of the dolly carrier pallet and fixed casters of the dollies are located at ends of the dolly carrier pallet.

Optionally, one swivel caster of each dolly is provided with a brake, and the brakes are offset relative to each other in a width-wise direction across the dolly carrier pallet.

Different aspects of the invention may be combined. Optional features of a given aspect of the invention may be combined with a different aspect of the invention.

DETAILED DESCRIPTION

Figure 1:
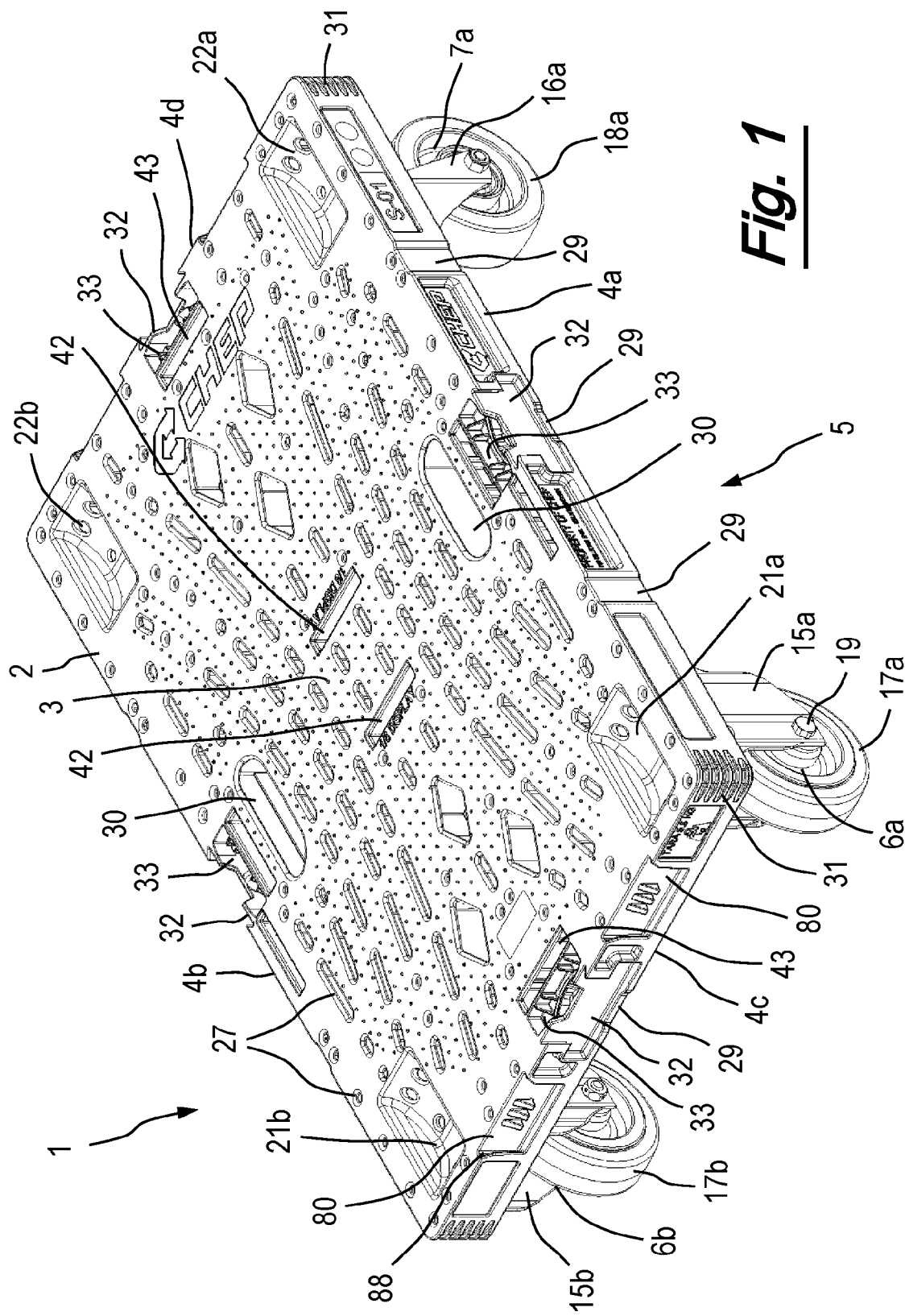
FIG. 1 illustrates a perspective view of a quarter dolly according to an embodiment of the present invention.
Figure 2:
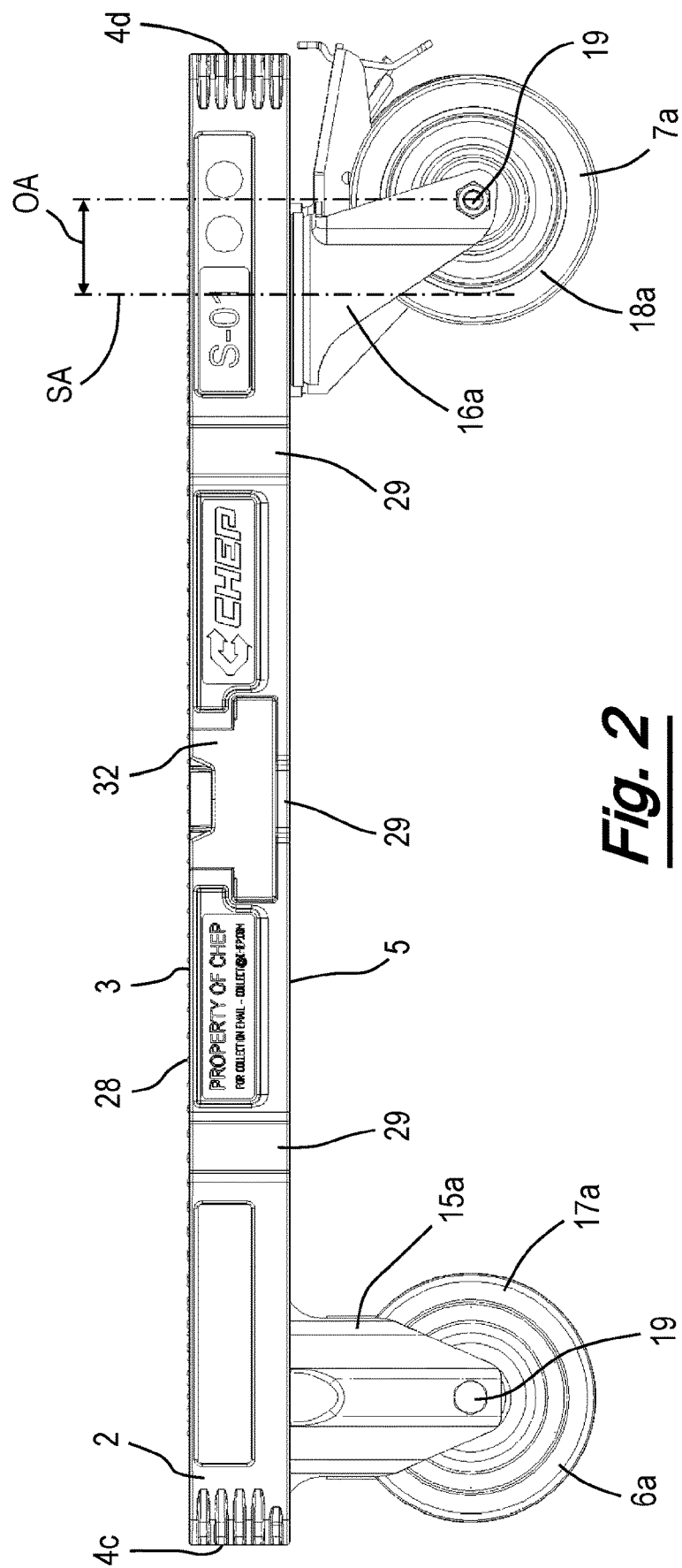
FIG. 2 illustrates a view of a first side of the quarter dolly of FIG. 1.
Figure 3:
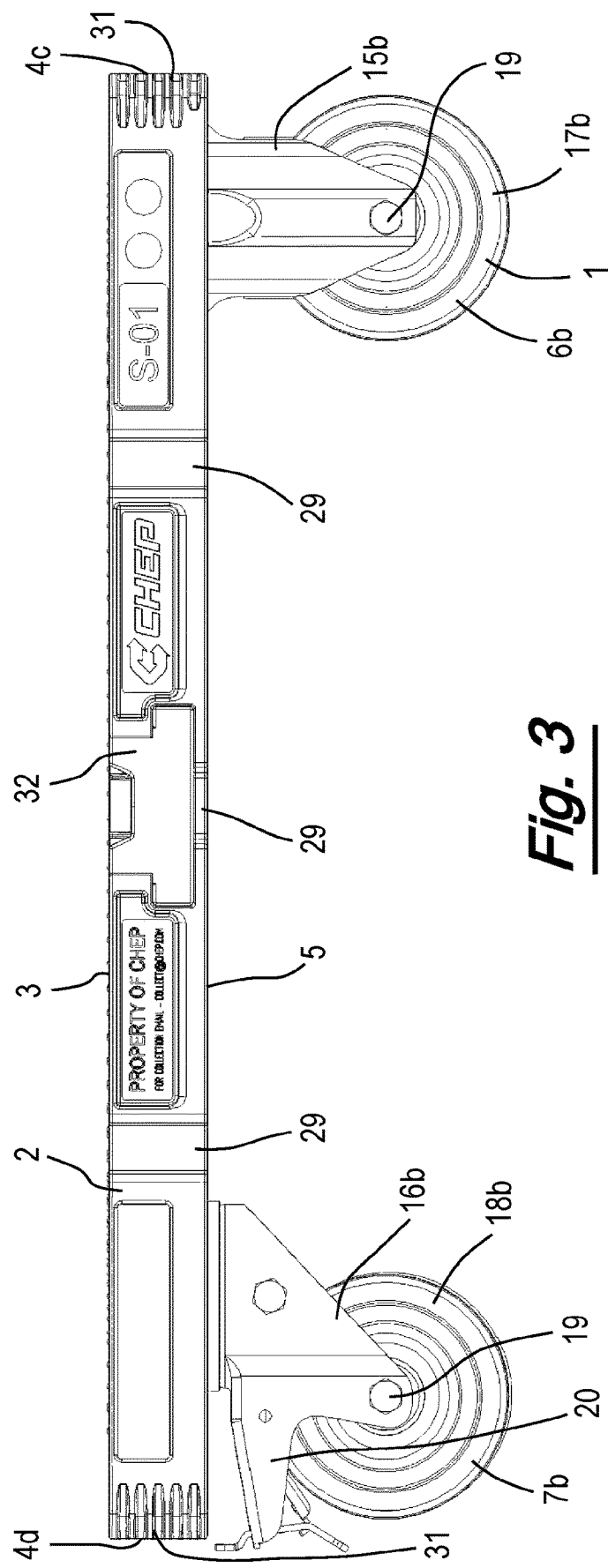
FIG. 3 illustrates a view of a second side of the quarter dolly of FIG. 1.
Figure 4:
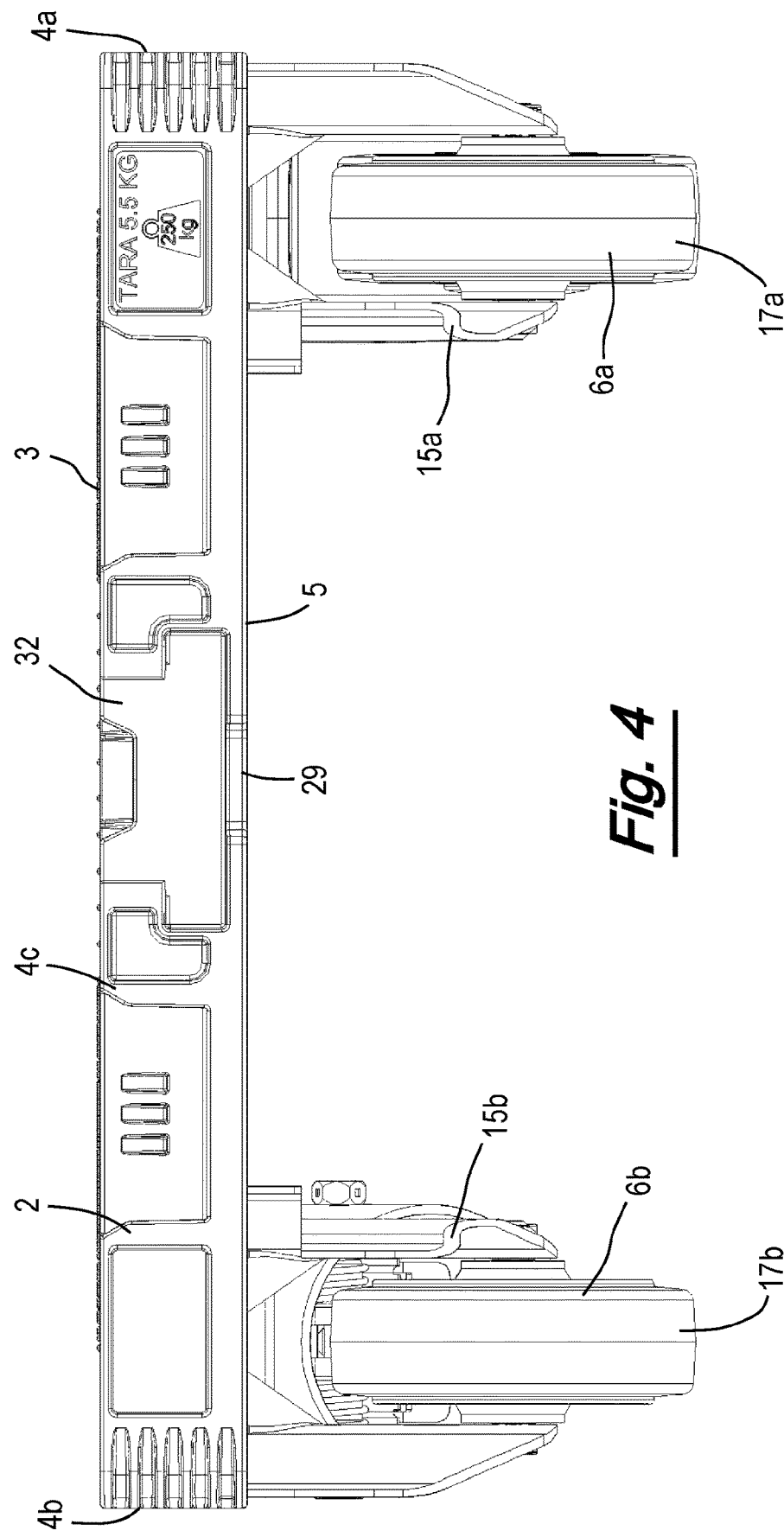
FIG. 4 illustrates a view of a rear end of the quarter dolly of FIG. 1 showing the end with two fixed casters.
Figure 5:
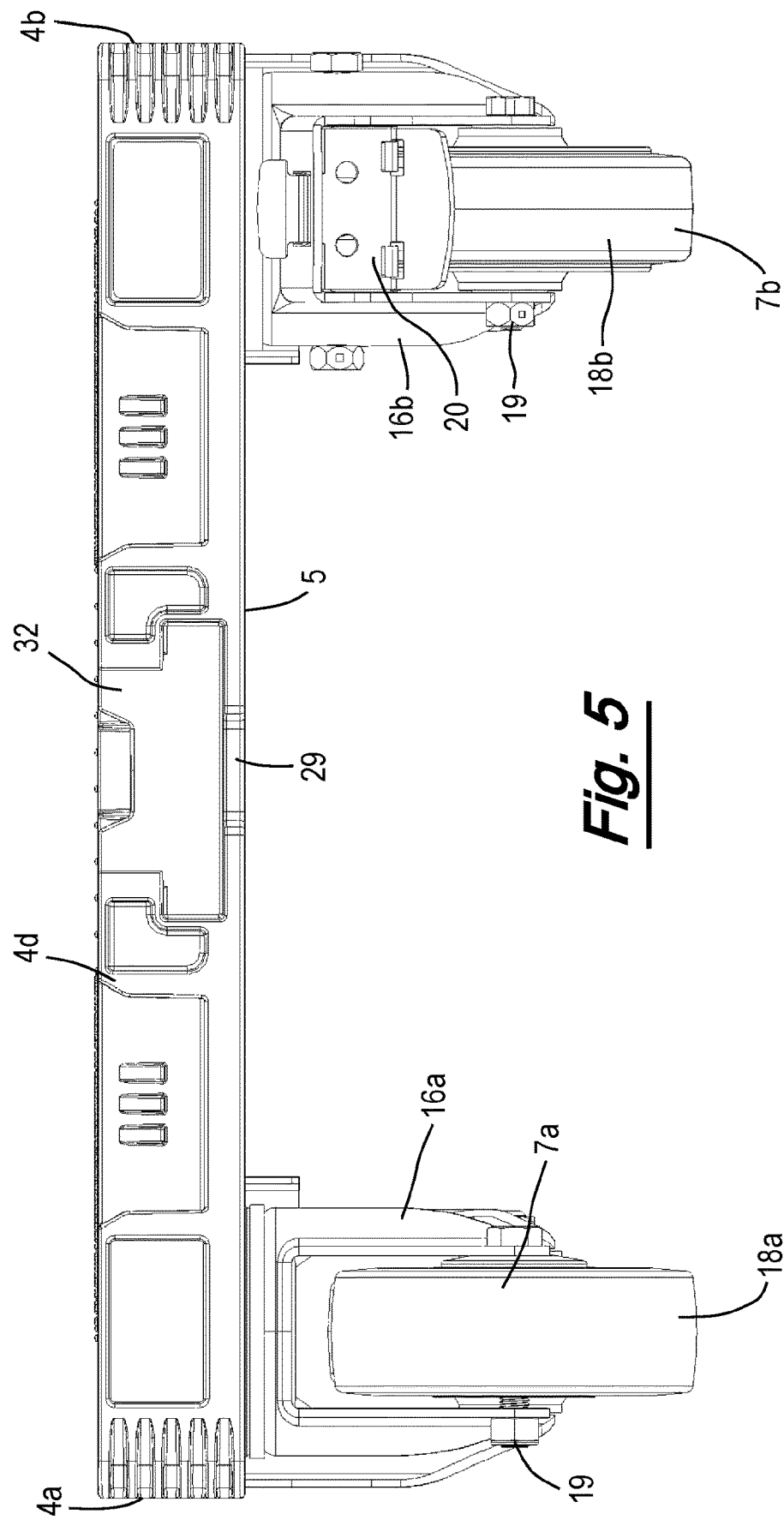
FIG. 5 illustrates a view of a front end of the quarter dolly of FIG. 1 showing the end with two swivel casters.
Figure 6:
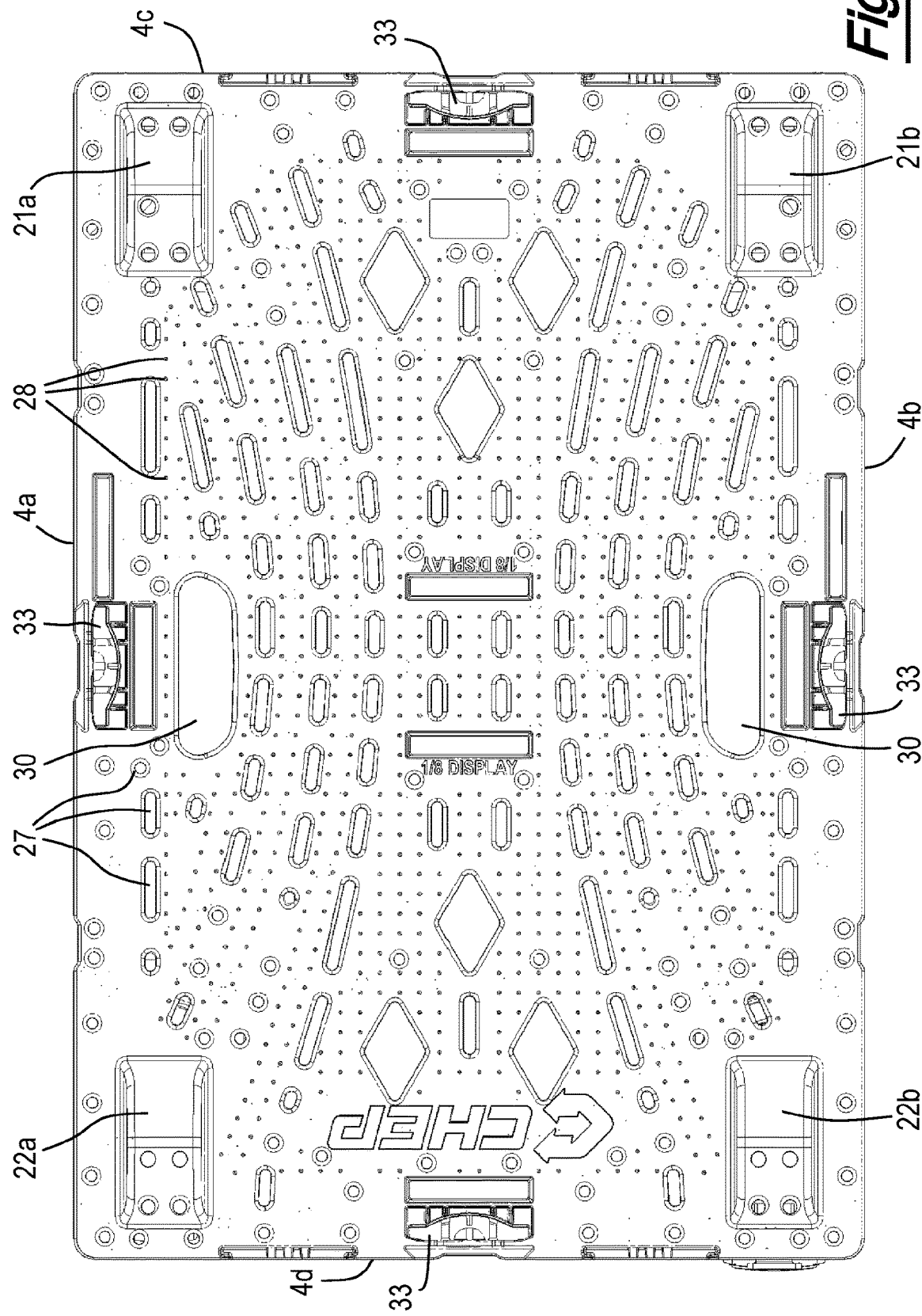
FIG. 6 illustrates a plan view of the quarter dolly of FIG. 1.

FIG. 1 shows a perspective view of a quarter dolly 1 according to an embodiment of the present invention, and FIGS. 2 to 13 show the quarter dolly 1 from a number of different viewpoints. The term quarter dolly is taken to mean any dolly being a quarter the size of a standard sized pallet according to any particular standard or region. For example, rectangular plan dimensions of platforms or pallets conforming to ISO 6780:2003(E) have lengths and widths of 1200×800 mm (commonly known as Euro size), 1200×1000 mm (commonly known as full size), and 1219×1016 mm. While the following description refers to a quarter dolly, it will be appreciated that the invention may be applied to any size of dolly.

The quarter dolly 1 comprises a deck 2, which may be formed from a plastic material, such as polypropylene. The deck 2 comprises a product support surface 3, two sides 4a, 4b (where sides refers to sides along the length of the quarter dolly 1) two ends 4c, 4d (where ends refers to sides along the width of the quarter dolly 1) and an underside 5 (see FIGS. 7 and 8). The dolly 1 has first and second fixed casters 6a, 6b and first and second swivel casters 7a, 7b. For the following description, the end 4d of the quarter dolly 1 containing the swivel casters 7a, 7b will be referred to as the front end, and the end 4c of the quarter dolly 1 containing the fixed casters 6a, 6b will be referred to as the rear end.

According to an embodiment, the width of the quarter dolly 1 is 399 mm (+1 mm, −2 mm), the length is 599 mm (+1 mm, −3 mm), the deck thickness is 40 mm, the clearance height (height of the quarter dolly 1 minus the deck 2) is 125 mm and the total height is 165 mm. The length and the width are chosen such that they are never greater than the standard size when taking into account the maximum tolerance. A corresponding approach may be used for other sized dollys. In an embodiment, the quarter dolly 1 is rated for a load of 250 Kg.

Figure 8:
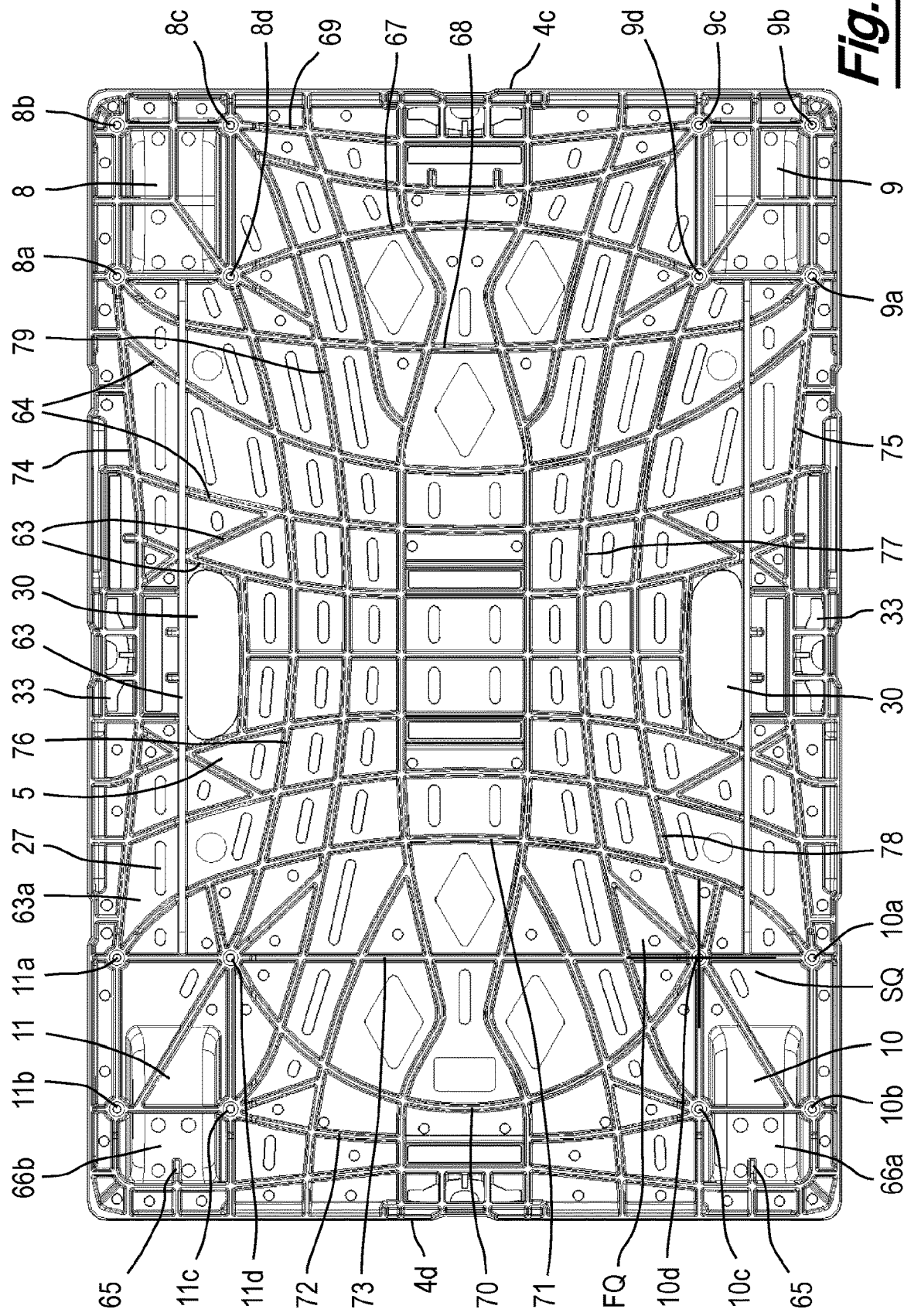
FIG. 8 illustrates a view of the underneath of the quarter dolly of FIG. 1 without the casters.

The casters 6a, 6b, 7a, 7b are attached to the underside of the dolly 1 at four caster mounting areas, 8, 9, 10, 11 (see FIG. 8). Each caster mounting area 8, 9 10, 11 comprises four mounting points, in the form of apertures in the underside 5 of the deck 2, through which self-threading fasteners 14 can pass, allowing the casters to be mounted to the quarter dolly 1. The first fixed caster 6a is connected to the first caster mounting area 8 at mounting points 8a, 8b, 8c, 8d. The second fixed caster 6b is connected to the second caster mounting area 9 at mounting points 9a, 9b, 9c, 9d. The first swivel caster 7a is connected to the third caster mounting area 10 at mounting points 10a, 10b, 10c, 10d. The second swivel caster 7b is connected to the fourth caster mounting area 11 at mounting points 11a, 11b, 11c, 11d.

While self-threading fasteners have been described as an example of how the casters 6a, 6b, 7a, 7b are connected to the deck 2, it will be appreciated that any suitable fixing means may be used.

Each caster 6a, 6b, 7a, 7b comprises a mounting plate 12a, 12b, 13a, 13b (see FIG. 7), two fork sections 15a, 15b, 16a, 16b, and a wheel 17a, 17b, 18a, 18b. The wheels 17a, 17b, 18a, 18b are mounted between their respective fork sections 15a, 15b, 16a, 16b via a nut and bolt 19, where the bolt 19 also provides a wheel axle about which the wheels 17a, 17b, 18a, 18b rotate. It will be appreciated that other means may be used to connect the wheels to the forks, such as rivets. The mounting plates 12a, 12b, 13a, 13b have four holes for receiving the four self-threading fasteners 14, allowing the mounting of the mounting plates onto the caster mounting areas on the underside 5 of the dolly 1

In an embodiment, the wheels 17a, 17b, 18a, 18b have a diameter of between 80 to 120 mm. In a preferred embodiment, the wheels 17a, 17b, 18a, 18b have a diameter of around 100 mm. However other wheel sizes may be used. The wheels 17a, 17b, 18a, 18b may be colour coded to assist with identification. In other words, the wheels 18a, 18b of the swivel casters 7a, 7b may have a different colour to the wheels 17a, 17b of the fixed casters 6a, 6b. For example, the wheels 18a, 18b of the swivel casters 7a, 7b may be blue, and the wheels 17a, 17b of the fixed casters 6a, 6b may be grey.

The swivel casters 7a, 7b can swivel about an axis perpendicular to the rotational axis of the wheel 18a, 18b. The fixed casters 6a, 6b do not have a mechanism that allows a swivel action and so cannot swivel about an axis perpendicular to the rotational axis of the wheel 17a, 17b. There is an offset OA between the wheel rotation axis 19 of the swivel casters 7a, 7b and a vertical swivel axis SA of the swivel caster 7a, 7b (see FIG. 2). In an embodiment, the offset OA may be equal to between 30 mm and 50 mm. In a preferred embodiment, the offset is around 40 mm.

One of the swivel casters 7b comprises a brake mechanism 20, which can be actuated in order to prevent rotation of the wheel 18b. It will be appreciated that such a brake mechanism can be applied to any number of the casters.

Figure 9:
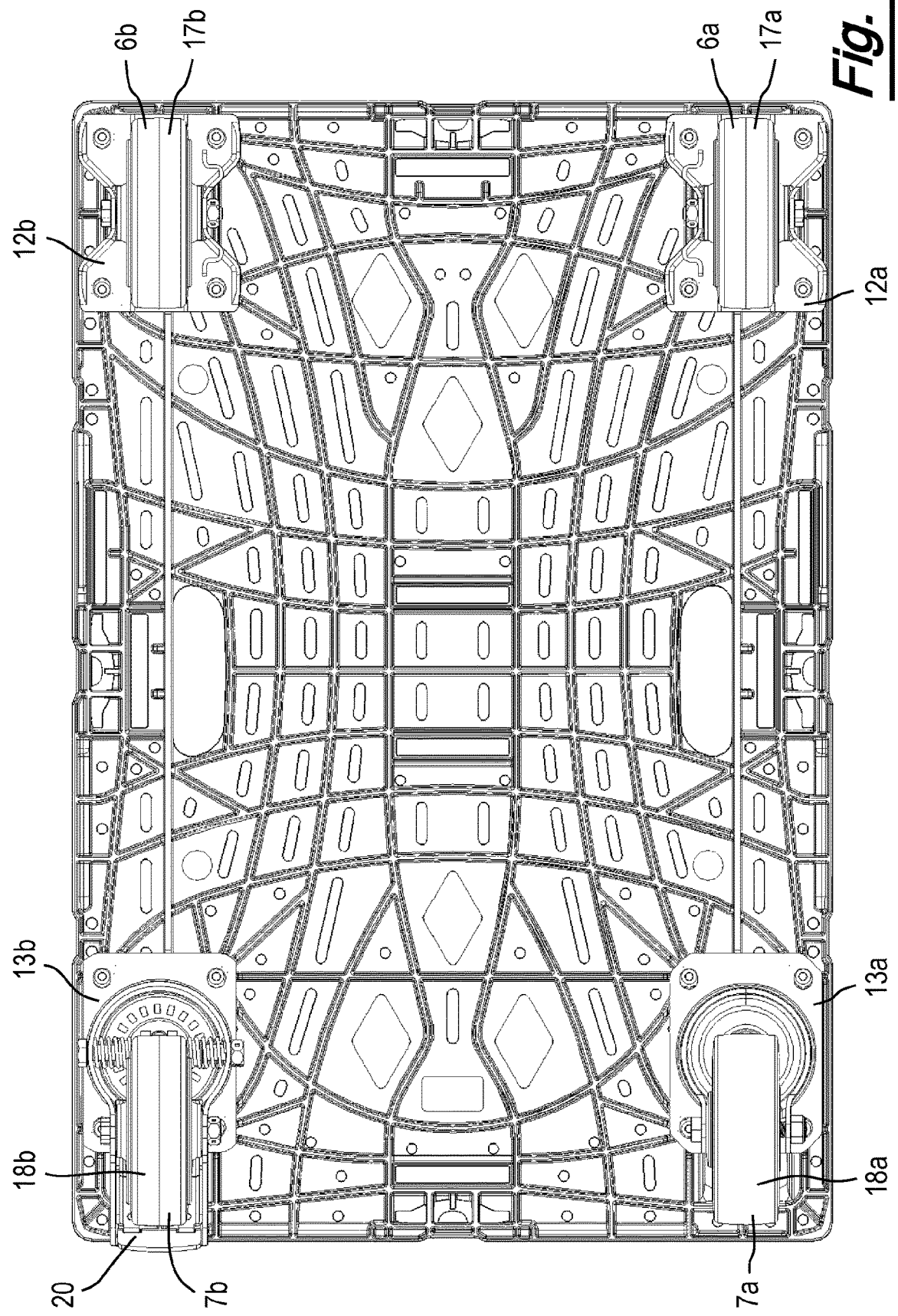
FIG. 9 illustrates a view of the underneath of a quarter dolly with swivel casters in an outboard position.
Figure 10:
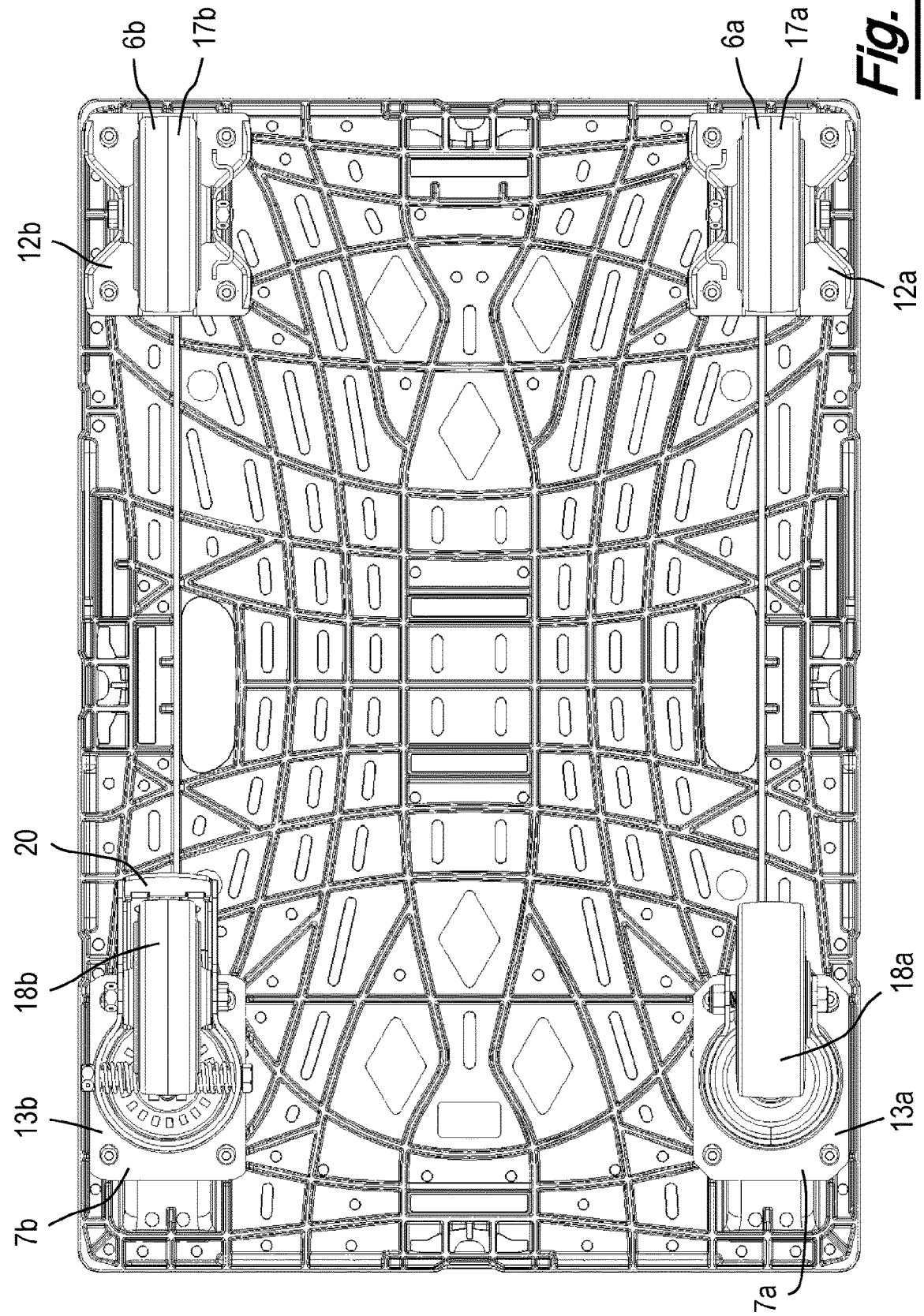
FIG. 10 illustrates a view of the underneath of the quarter dolly of FIG. 9 with swivel casters in an inboard configuration.
Figure 11:
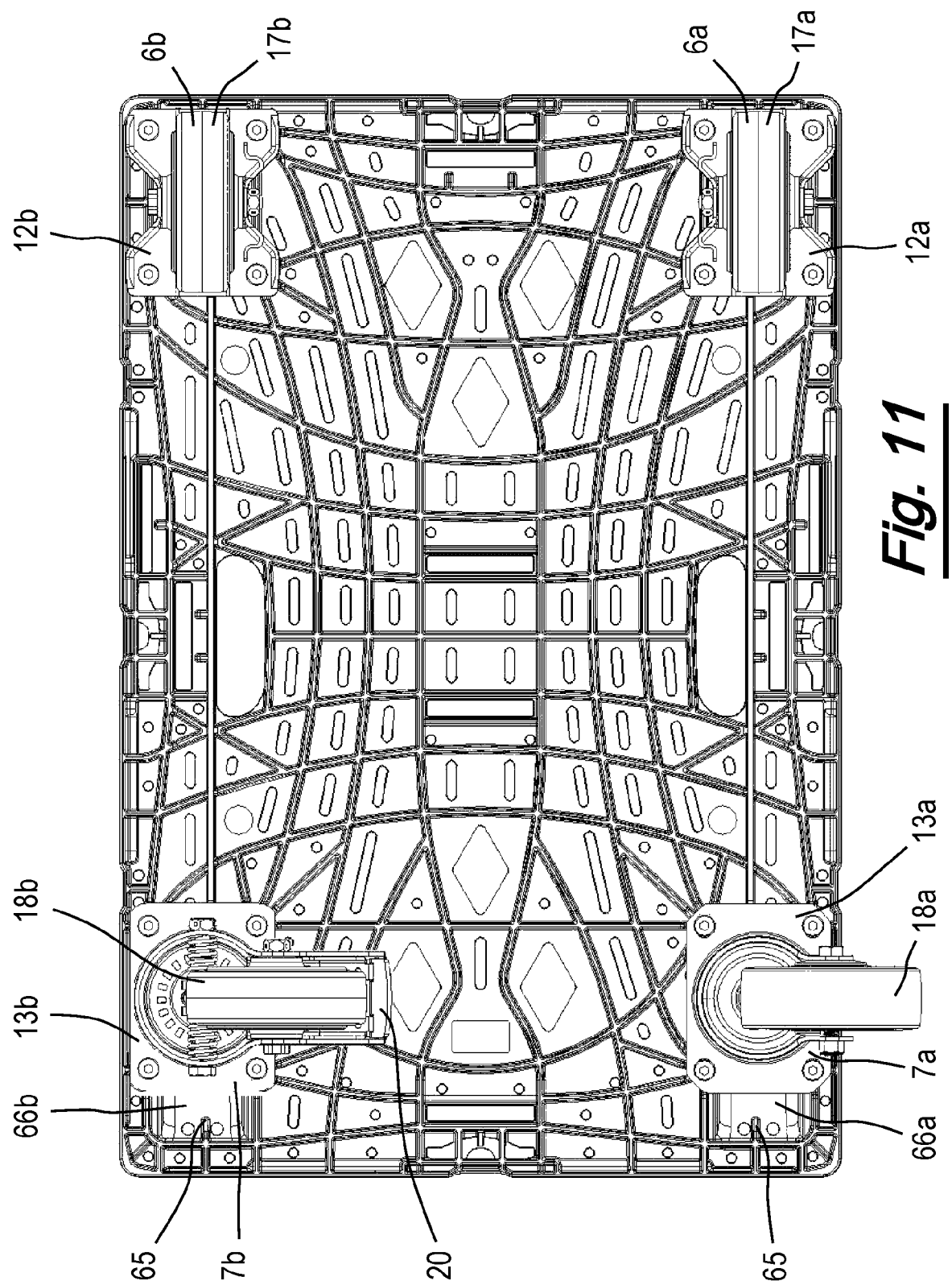
FIG. 11 illustrates a view of the underneath of the quarter dolly of FIG. 9 with swivel casters rotated 90 degrees clockwise from the inboard position.
Figure 12:
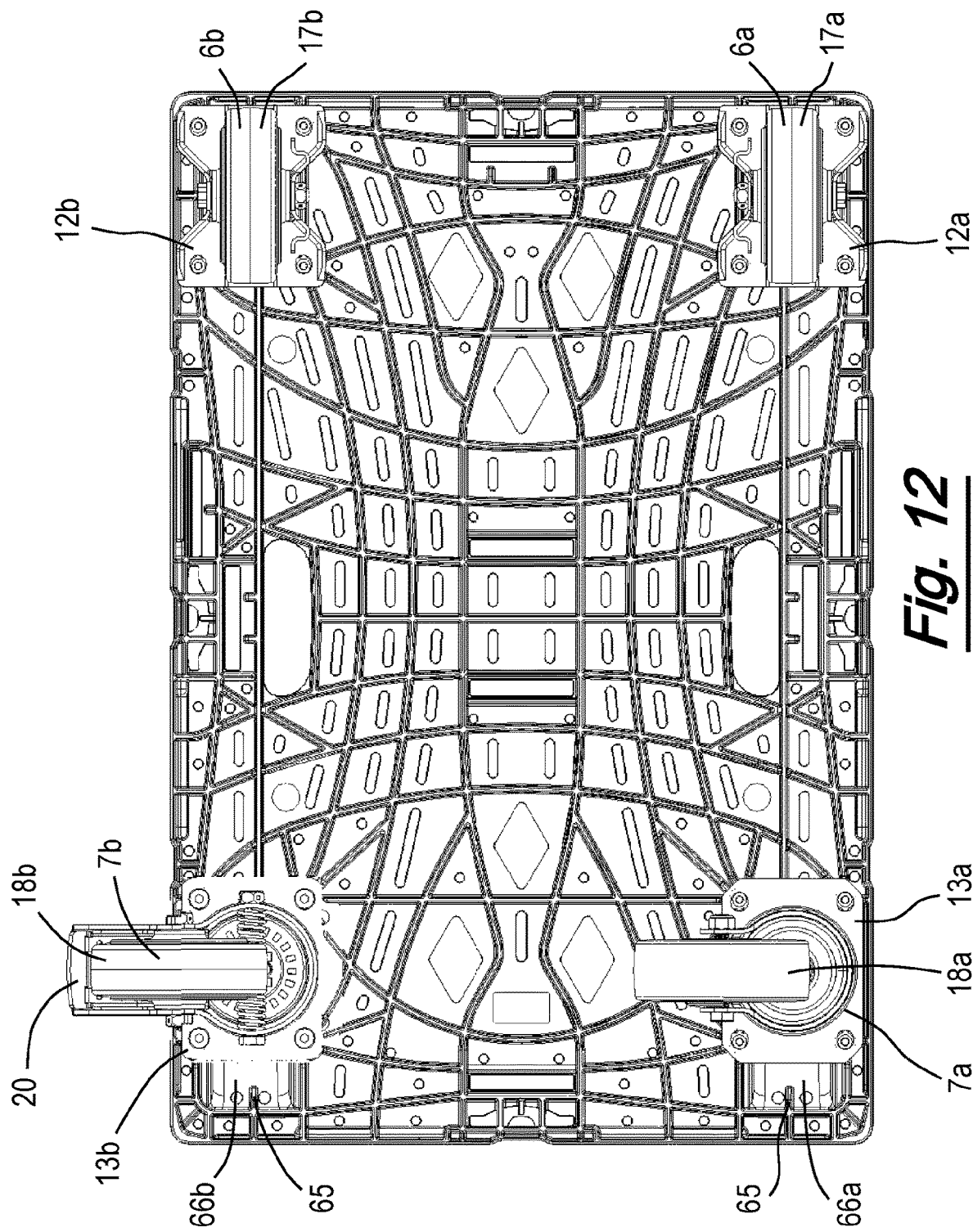
FIG. 12 illustrates a view of the underneath of the quarter dolly of FIG. 9 with swivel casters rotated 90 degrees anticlockwise from the inboard position.

The casters 6a, 6b, 7a, 7b allow the quarter dolly 1 to be easily moved around a surface such as a shop or warehouse floor, where the swivel casters 7a, 7b allow the quarter dolly 1 to be steered while it is being rolled. FIGS. 9 to 12 show the swivel casters 7a, 7b in different orientations. FIG. 9 shows the swivel casters 7a, 7b orientated in an outboard direction. FIG. 10 shows the swivel casters 7a, 7b at 180 degrees from the outboard direction (also known as the inboard direction). FIG. 11 shows the swivel casters 7a, 7b at 90 degrees clockwise from the inboard direction. FIG. 12 shows the swivel casters 7a, 7b at 90 degrees anti-clockwise from the inboard direction.

Figure 14:
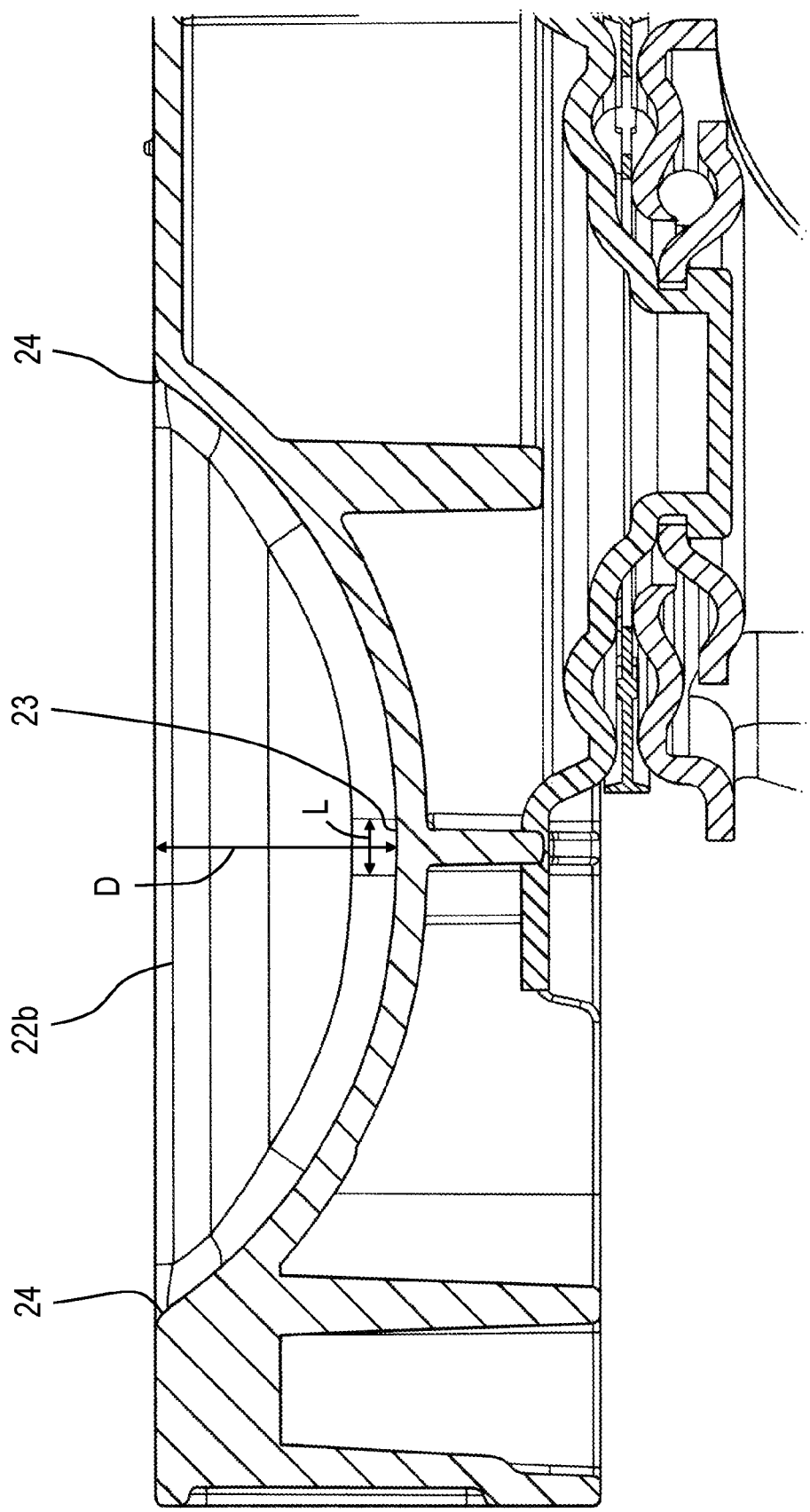
FIG. 14 illustrates a cut away side view of a wheel receiving portion.

When the quarter dolly 1 is not in use, it may be stored with other quarter dollys by stacking the quarter dollys on top of one another. A stack of quarter dolly 1 may be placed on top of a transport pallet (commonly known as a slave pallet). To facilitate stacking of the quarter dolly 1, the product support surface 3 comprises four wheel receiving portions 21a, 21b, 22a, 22b, which take the form of indents in the product support surface 3. FIG. 14 shows a cross section through a wheel receiving portion 22b according to an embodiment. The wheel receiving portions 21a, 21b, 22a, 22b, are generally elliptical in shape and have a flat bottom surface 23. The length L of the flat bottom surface 23 is between 3 and 7 mm, and preferably around 5 mm. The depth D of the wheel receiving portions (the distance from the flat bottom surface 23 to the product support surface 3, is between 20 and 23 mm, for example 21.7 mm. The width of the wheel receiving portions is between 35 mm and 45 mm, and may be about 40 mm. The radius of the wheel receiving portions is between 45 and 55 mm, and may for example, be about 48 mm. In one embodiment, the radius of the wheel receiving portions is larger than the radius of the wheels 17a, 17b, 18a, 18b. The shapes of the wheel receiving portions 21a, 21b, 22a, 22b may be chosen so as to more conveniently locate the wheels in the wheel receiving portions, with minimal movement. For example, the wheel receiving portions may have curved edges 24 which curve in an opposite direction to the curve of the wheel receiving portion. These curved edges 24 help to more easily locate the wheels of another dolly in the wheel receiving portion. In an alternative embodiment, the radius of the wheel receiving portions 21a, 21b, 22a, 22b is less than the radius of the wheels 17a, 17b, 18a, 18b. By having a wheel receiving portion with a radius that is smaller than the radius of the wheel, the wheel contacts the edges 24 of the wheel receiving portion and the wheel is effectively gripped by the edges 24. This arrangement may prevent unwanted movement of a dolly stacked on top of another dolly, e.g. prevents stacked dolly's rocking. In another embodiment, the radius of the wheel receiving portion is the same as the radius of the wheels.

In another embodiment, the wheel receiving portions do not have a flat bottom surface, but instead comprise a continuous elliptical curve.

The stacking configuration of the quarter dolly 1 has been optimized for an increase in the quantity of dollys stacked within a given height. The individual quarter dolly 1 height (distance from the bottom of the wheels to the surface of the product support surface 3, not including a lip or other raised feature extending above the product support surface). Furthermore, the clearance of the dolly, that is the distance from the bottom of the wheels to the bottom of the deck 2, has not been changed to allow the same Manual Handling Equipment (MHE) clearance as previous prior art quarter dollys.

Figure 15:
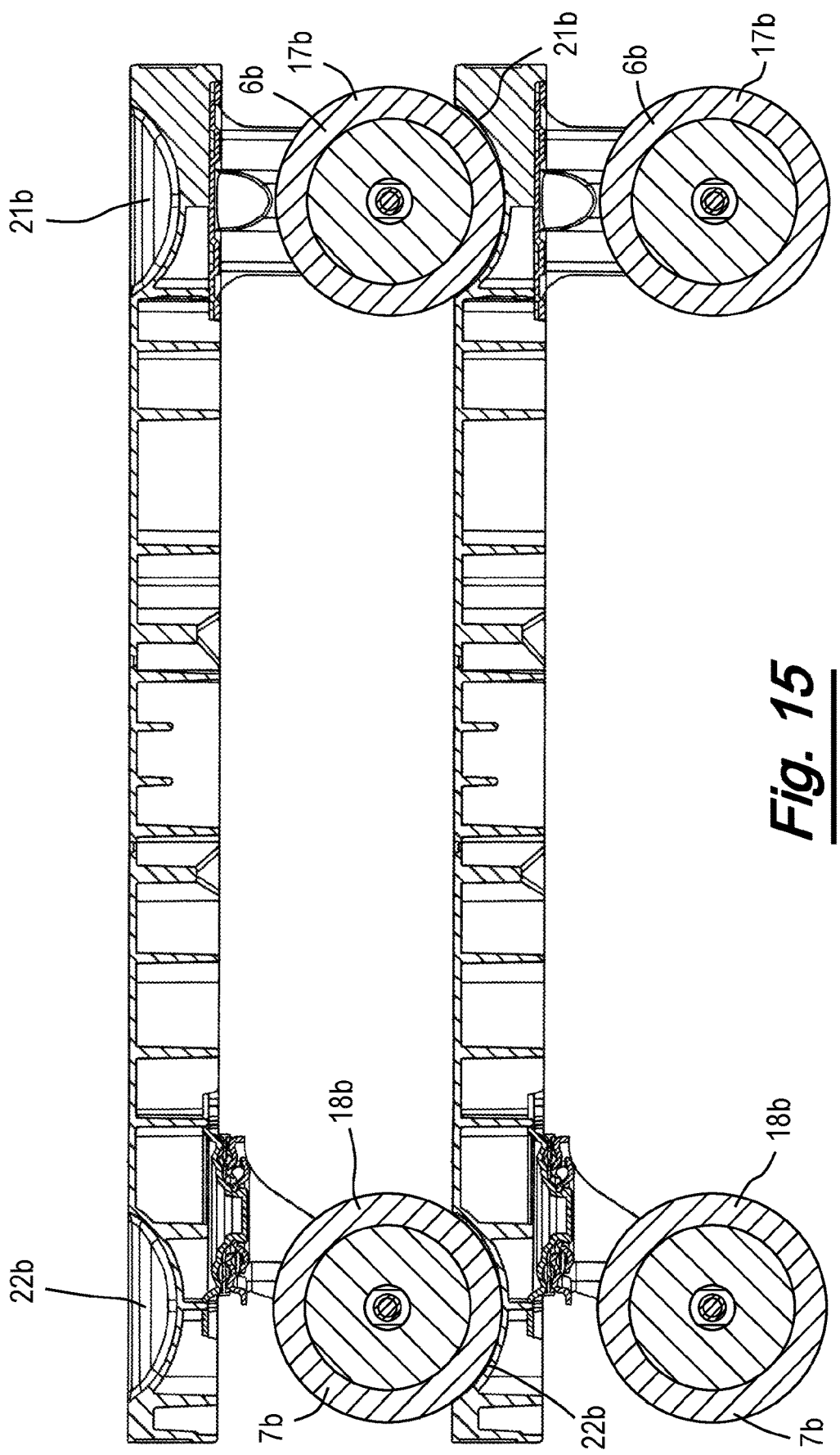
FIG. 15 illustrates a cut away side view of two dollys in a stacked configuration.
Figure 16:
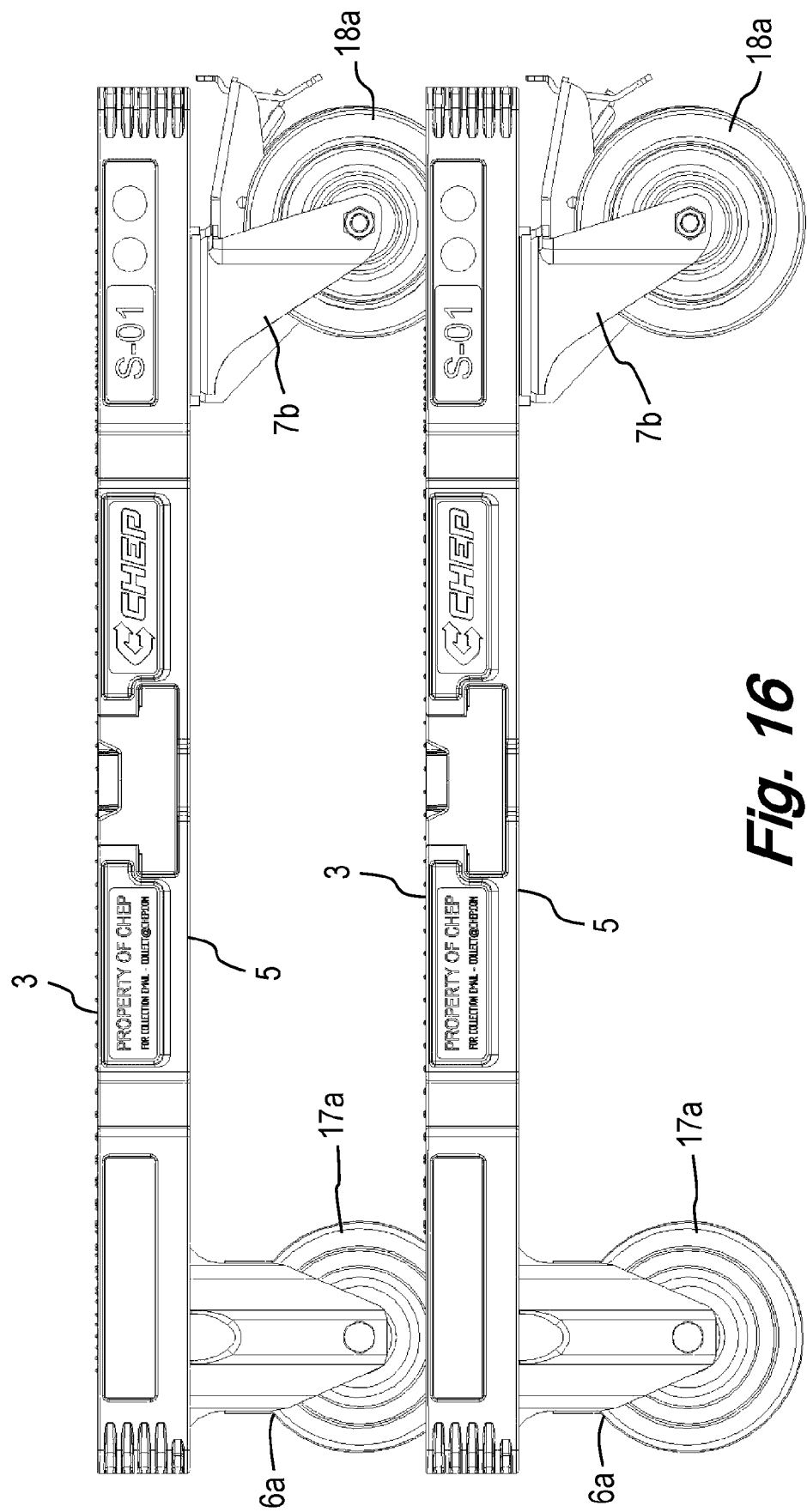
FIG. 16 illustrates a side view of the two dollys in a stacked configuration of FIG. 15.

FIGS. 15 and 16 illustrates a second quarter dolly 1a stacked on top of the quarter dolly 1, showing the wheels of the second quarter dolly 1a being located in the wheel receiving portions of the quarter dolly 1.

Figure 17:
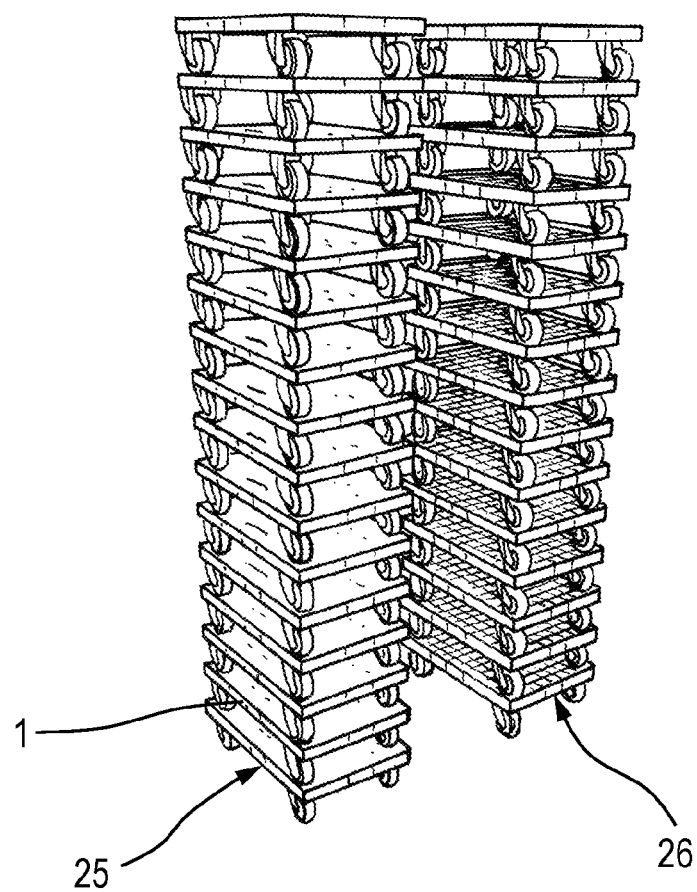
FIG. 17 illustrates a comparison of a stack of dollys according to an embodiment of the invention, against a stack of prior art dollys.

FIG. 17 shows a plurality of quarter dollys in a stacked arrangement. The left stack 25 shows sixteen quarter dollys 1 according to an embodiment of the present invention, and has a total height of 2310 mm. The bottom quarter dolly in the stack 25 has an effective height of 165 mm, and each additional quarter dolly has an effective height of 143 mm, that is, the wheel receiving portions allow the quarter dolly on top to penetrate a distance of 22 mm into the quarter dolly underneath. In contrast, the right stack 26 shows fifteen prior art quarter dollys, which has a total height of 2315 mm. The bottom prior art quarter dolly in the right stack 26 has an effective height of 173 mm, and each additional quarter dolly has an effective height of 153 mm.

Therefore, there is a reduced storage space requirement for both storage of the quarter dollys, and during transportation of the quarter dollys, e.g. when they are being collected, stored or transported. For example, a truck which was previously able to transport stacks of fifteen dollys can now transport stacks of sixteen dollys. This reduced stacking height may also allow safer manoeuvres by a user. In particular, when destacking a given number of quarter dollys, the user would not need to reach so high. This increase in the number of quarter dollys that can be stacked within a given height has been achieved by increasing the depth of the wheel receiving portions over existing quarter dollys. A prior art quarter dolly has a wheel receiving portion depth of 12 mm, whereas an embodiment of the quarter dolly 1 of the present invention has a wheel receiving portion depth of 21.7 mm. This allows the wheels of an upper dolly to penetrate further into the wheel receiving portions of a lower dolly, giving the upper dolly a lower effective height than could previously be achieved. In general, increasing the depth of the wheel receiving portions will reduce the stack height of a given number of dollys. The depth may for example be greater than 15 mm, and may for example be 20 mm or more.

Increasing the depth of the wheel receiving portions can lead to a reduction in the structural integrity of the quarter dolly 1. For example, a deeper wheel receiving portion means there is less room underneath the wheel receiving portion to accommodate reinforcing ribs. Therefore, the height of any reinforcing ribs underneath the wheel receiving portions will have to be reduced if a flat underside is to be maintained. Various aspects of the invention are configured to counter this reduction in structural integrity, and are described in detail further below.

The deck 2 has a number of apertures 27 in the product support surface 3 which allow a liquid (e.g. water/rain) to pass through the quarter dolly 1. The deck 2 also has a number of raised dots 28 (see FIG. 2) which can aid with providing greater friction between the product support surface 3 and a product placed upon the product support surface 3. The quarter dolly 1 has three banding positions 29 along each side 4a, 4b, and one along each end 4c, 4d. However, it will be appreciated that any number of banding positions may be used, such as three along both the sides and ends. The deck 2 comprises two handle holes 30 for carrying the quarter dolly 1. The handle holes 30 are arranged adjacent to the edges of the sides 4a, 4b of the dolly 1, midway between the corners of the dolly 1. This arrangement facilitates carrying the quarter dolly 1, allowing a user to hold the quarter dolly 1 vertically while carrying the quarter dolly 1. Furthermore, by being arranged midway between the corners, the handle holes 30 are in line with the centre of gravity of the dolly 1 while it is being carried.

When viewed from the side, the underside 5 of the quarter dolly 1 is flat, to allow forklift trucks, conveyers and other MHEs to more easily pick up, and move the quarter dolly 1. Any features protruding from the underside (excepted for the casters) may be damaged when being picked up by the tines of a fork lift truck, for example.

Figure 21:
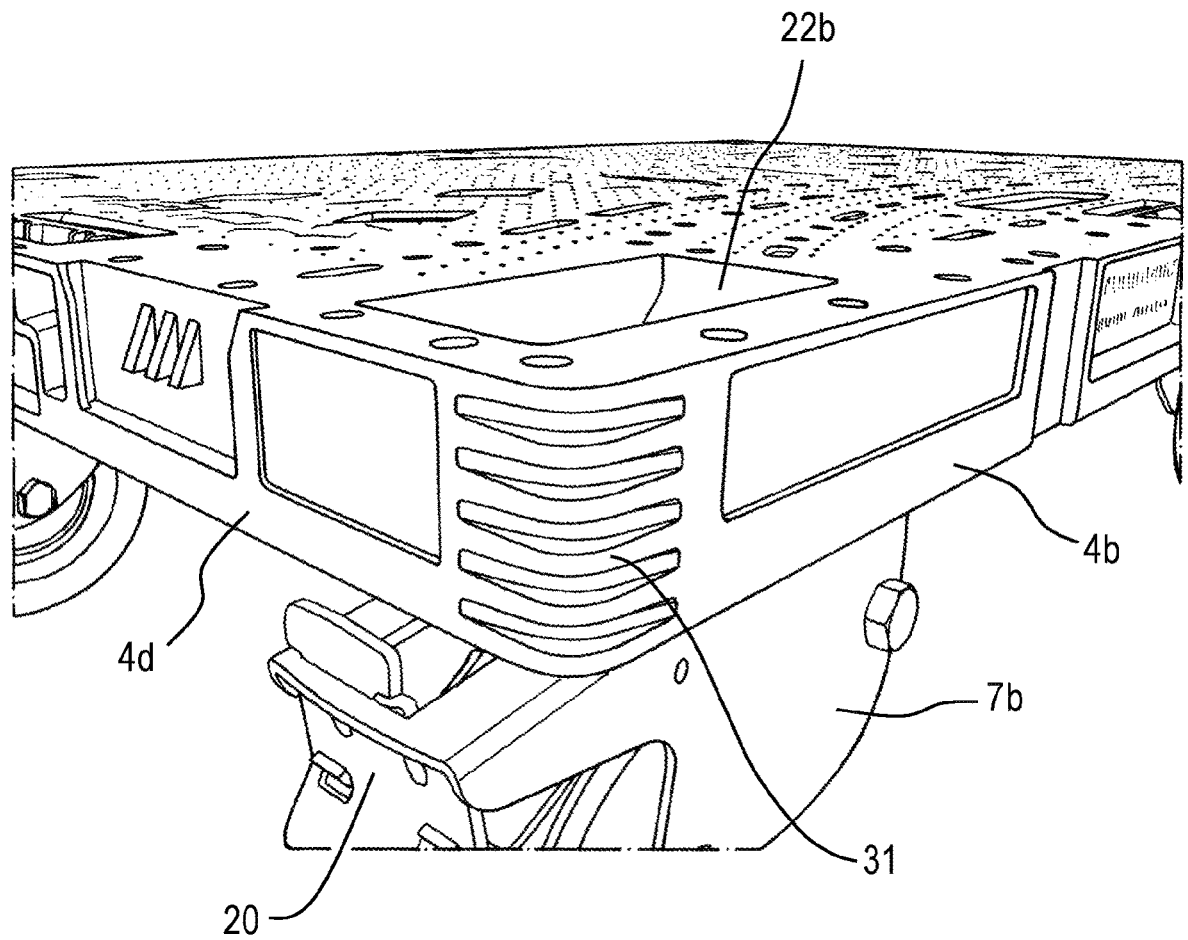
FIG. 21 illustrates an enlarged perspective of a corner a quarter dolly.

The quarter dolly 1 has a number of horizontally arranged ribs 31 at its corners (see FIG. 21) which assist with the application and retention of shrink wrap over a product on the quarter dolly 1—such shrink wrap is commonly used to secure the product to the quarter dolly 1. This is often an alternative to banding, although both can be applied if desired. The ribs 31 allow for stretch wrap, for example, to be more easily gripped by the quarter dolly 1 when it is wrapped around products on the quarter dolly 1.

The quarter dolly 1 features four T-shaped edge recesses 32, where one T-shaped edge recesses 32 is arranged on each side 4a, 4b, and end 4c, 4d of the quarter dolly 1. The T-shaped edge recesses 32 are arranged to receive T shaped tabs that selectively can descend from the base of a product tray or package that gets loaded onto the quarter dolly 1. Such tabs allow a product tray or package to lock onto the quarter dolly, or at least to be held more securely, thus increasing stability.

Figure 22:
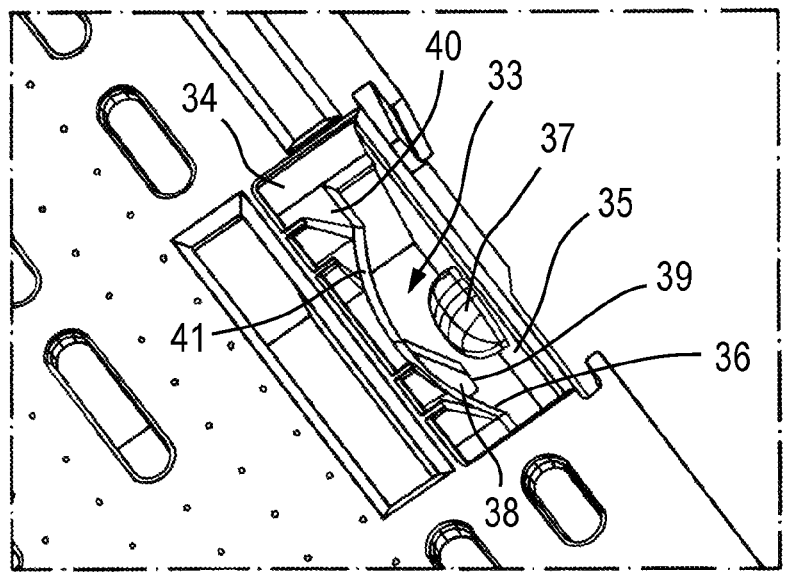
FIG. 22 illustrates an enlarged view of a slot which may form a part of an embodiment of the invention.

The quarter dolly 1 includes four slots 33 located in the product support surface 3 at the centre of each side 4a, 4b, and end 4c, 4d of the quarter dolly 1 (see FIG. 22 which shows an enlarged view of the slot 32). The recessed slot 33 has a set of surrounding walls 34, a flat top 35 and a humped bottom 36 when looking in plan. It also has projections associated therewith for interacting with a tab once one it is inserted in the slot. The recessed slot 33 has a recessed projection 37 which takes the form of a rounded or part-spherical member. The recessed projection 37 is arranged with a rounded surface pointing generally upwards and has a flat bottom facing downwards.

The recessed slot 33 comprises a further member 38 formed in an opposite wall of the slot 33 from the projection 37. In the illustrated embodiment, the further member 38 is a tapered or angled leg. The further member 38 is shown to have a free end 39 that extends to a plane that is in a vertical alignment with the nose of the projection 37, but which is located at a level lying below that nose. During use, a tab on an underside of a box placed onto the quarter dolly 1 can be encouraged to extend into this slot 33 such that it will flex both around the projection 37, and against the further member 38, thus being held in place therein.

If the tab has an appropriately positioned hole, that hole can engage and lock onto the projection 37, or the further member 38.

In use, a tab of a display is inserted into the slot 33. The tab is configured such that it has an aperture which can be fitted over the projection 37 so as to "click" the tab in place. A diameter of the aperture in the tab may be the same, or, where an elastic material is used for the tab or extended portion 37, slightly less than the diameter of the protrusion 37, so as to facilitate a tight fit.

The top of the recessed projection 37 is shown to be in general alignment with a recessed shelf 40 of the slot. The shelf 40 has a thickness below it, which thickness is integral with the further member 38 and it is arranged such that the further member extends perpendicular to a leading edge 41 of the shelf—towards, yet downwards relative to, the recessed projection 37. As shown, the leading edge is curved, so as to define a curved shape of the slot to facilitate clicking a tab into place.

The slots 33 of the illustrated embodiment are recessed relative to the product support surface 3, but in other embodiments may be flush with the product support surface. Similarly, although the illustrated projection 37 is recessed relative to the product support surface, in other embodiments the projection may be flush with the product support surface 3.

Although a particular shape of slot 33 is illustrated, any other shape of slot may be used. For example, the slot may be curved or non-rectangular. Similarly, although a particular shape of projection 37 is illustrated, the projection may have any shape suitable for being received in an aperture of a tab.

Figure 23:
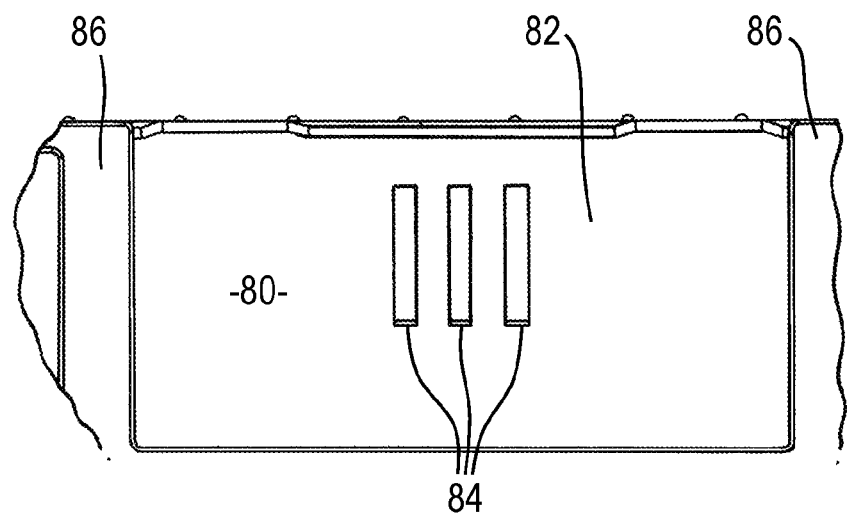
FIG. 23 illustrates an enlarged view of an attachment feature which may form a part of an embodiment of the invention.

FIG. 23 is a view from one side of an attachment feature 80. Attachment features are provided on the ends 4c, 4d of the quarter dolly. Two attachment features 80 are visible in FIG. 1. Fewer or more attachment features 80 may be provided. These features comprise a vertically arranged, inwardly recessed, slot 82. Each slot 82 has an open top for receiving a descending tab from a display package for locating on the dolly. The slot 82 further has a set of engagement teeth 84 or members extending laterally across the short width of the slot, i.e. perpendicular to the respective wall of the top of the dolly. These teeth are shown to have a tapered side (the face that faces away from the sidewall of the top) and a flat bottom (the face that faces downwardly during normal use of the dolly), and thus they resemble a saw-tooth in vertical plan, when seen parallel to the longitudinal length of the slot. In this example, the set of teeth comprises three teeth. However, fewer or more teeth may be provided. Even a single tooth can be provided.

Sidewalls 86 extend inwardly from outer edges of the slot 80 and define a gap 88 which can receive edges of a tab (the gap is visible in FIG. 1). The gaps allow the tab to locate and be gripped or held both laterally as well as longitudinally in the slots. The tooth, member, element, point or projection then also hold it vertically, thus providing a reliable securement of the tab once inserted in the slot, but yet one that can easily have the tab removed if needed, e.g. through a sidewards ejection.

In place of sawteeth, other shapes, including rounded members may be provided. The flat bottom is also non essential (for both forms of slot), although flat bottoms (or a lowermost outward point) does assist with providing a positive location for gripping a tab, especially where that tab has a hole for receiving that tooth, member, element, point or projection. The tooth, member, element, point or projection may grip the descending tab, or engage in a hole thereof if such a hole is provided, to make the package more secure on the dolly.

As mentioned above, in this example, there is a pair of these slots at each end of the top of the dolly. Further, it is to be observed that each of those individual slots are paired with a matching one of the slots at the opposite end of the dolly.

The slot may be recessed relative to the end wall of the dolly by about 4 mm, thus accommodating a tab made from a sheet material (e.g. corrugated cardboard) having a thickness of up to 4 mm without crushing the corrugations in those edge portions. Thicker boards can also be accommodated, but they will be crushed as necessary. A wider width may be preferred for certain applications, although 4 mm is preferred for most applications.

The quarter dolly features two one eighth display slots 42 which are provided to cooperate with opposing slots 43 for locating and holding one eighth size displays. Such one eighth size displays are sized such that two of them can be fitted onto the quarter dolly 1 since the quarter dolly 1 is a quarter of the size of a standard platform Thus the one eighth size displays occupy approximately half the product support surface 3 of the quarter dolly 1.

In an embodiment, the two swivel casters 7a, 7b comprise a self-centring mechanism (see FIGS. 18 to 20), which provides a torque so as to allow the wheels 18a, 18b of the swivel casters 7a, 7b to be returned to a predetermined position. The torque provided to the wheels 18a, 18b is arranged to be low enough that the wheels 18a, 18b do not self-centre when the unloaded quarter dolly 1 is on the ground, but strong enough to return the wheels 18a, 18b to the predetermined position when the wheels 18a, 18b are free to swivel, such as when the wheels 18a, 18b are not in contact with the ground. In an embodiment, the unloaded quarter dolly 1 weighs between 5-7 Kg. Therefore, the torque provided by the self-centring mechanism is configured such that when the quarter dolly 1, weighing between 5 Kg and 7 Kg, is placed on a typical floor (such as concrete or tile), the torque is insufficient to overcome the friction between the floor and the caster.

Figure 7:
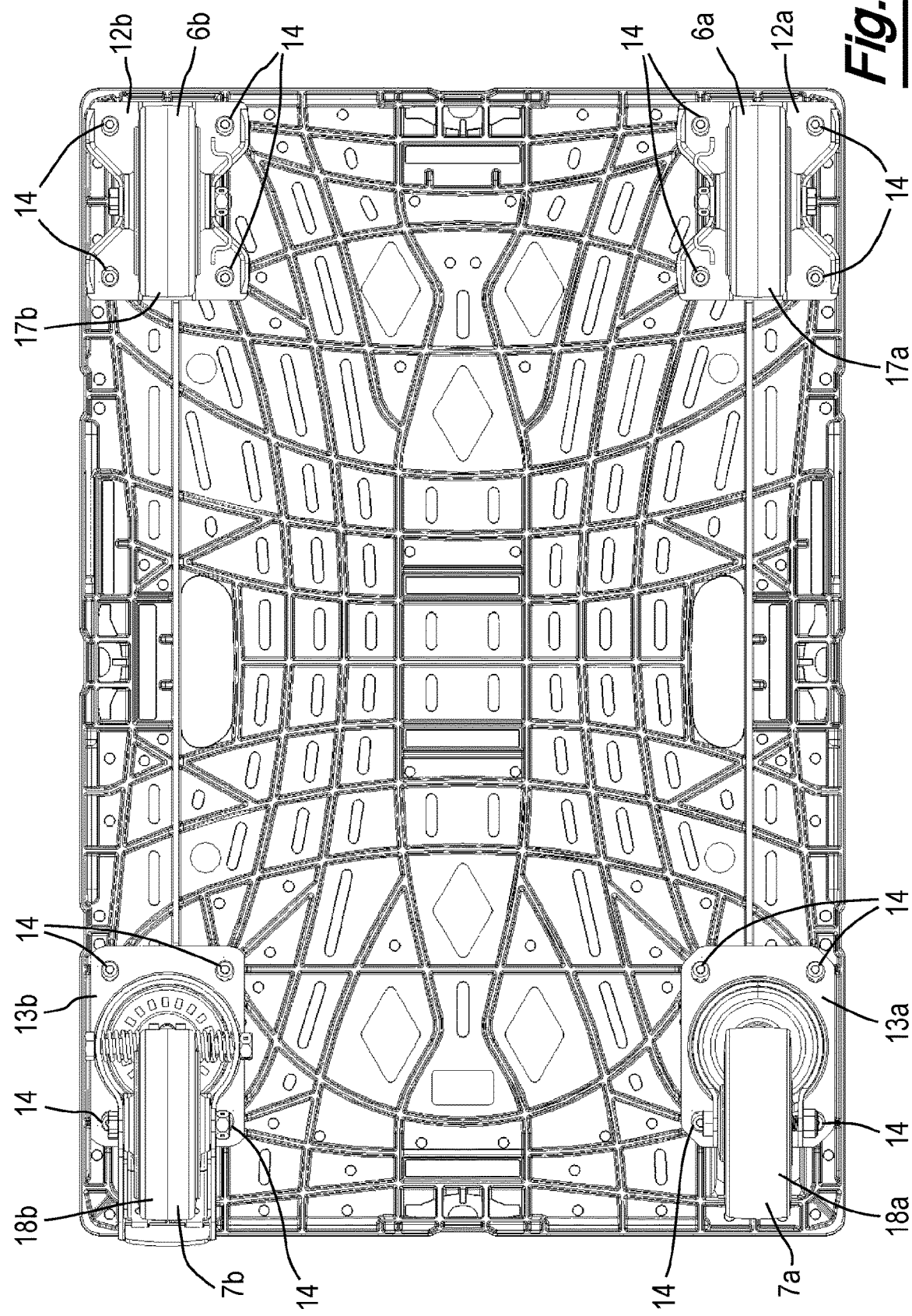
FIG. 7 illustrates a view of the underneath of the quarter dolly of FIG. 1.

In an embodiment, the self-centring mechanism biases the wheels 18a, 18b of the swivel casters 7a, 7b to the outboard position as depicted in FIG. 7. This arrangement means that when the quarter dolly 1 is lifted off the ground to be placed on top of a transport pallet, or another quarter dolly 1, during a stacking procedure, the wheels 18a, 18b will automatically be orientated correctly for being received in the wheel's respective wheel receiving portion 21a, 21b. In prior art quarter dollys, during lifting and transportation, the wheels must be manually rotated from any number of possible orientations to be received in the wheel receiving portions. This must be done for every dolly lifted, and can consume a considerable amount of time as well as posing a health and safety risk.

Figure 18:
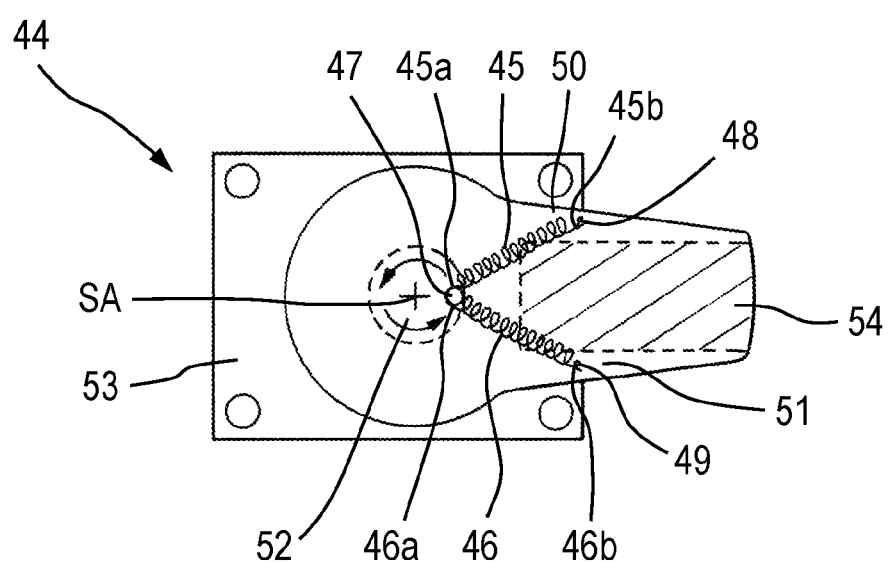
FIG. 18 illustrates a schematical cross-section through a self-centring mechanism in an equilibrium position, according to an embodiment.

FIG. 18 illustrates a cross section through a swivel caster 44 in the plane perpendicular to the swivel axis SA. The swivel axis SA is marked with a cross and has two circumferential arrows illustrated around the cross which point anticlockwise. This is for illustration purposes only, and it will be appreciated that the wheel can swivel in both clockwise and anticlockwise directions. The swivel caster 44 comprises a self-centring mechanism according to an embodiment. Note that while the embodiments of the quarter dolly 1 shown in FIGS. 1 to 17, and 21 to 22 do not show a self-centring mechanism, the self-centring mechanism may be used with any embodiment of the quarter dolly 1.

FIG. 18 shows the self-centring mechanism in an equilibrium position. The self-centring mechanism comprises two springs 45, 46 which provide the biasing force for the self-centring mechanism. Each spring is connected at one end 45a, 46a to a roller bearing 47, and at their other ends 45b, 46b, connected to mounting points 48, 49 on each fork 50, 51 of the caster 44. The roller bearing 47 is mounted on a plate 52 at a position which is offset from the swivel axis SA. The plate 52 is fixed with respect to a mounting plate 53 of the caster 44 such that the plate 52 does not rotate with respect to the mounting plate 53. That is, as a wheel 54 of the caster 44 swivels about the swivel axis SA, the plate 52, and roller bearing 47, do not swivel about the swivel axis SA. Note that the roller bearing 47 may be able to rotate about its own axis so as to keep the springs from physically contacting one another as the wheel 54 rotates. The springs 45, 46 are examples of biasing means.

When in the equilibrium position, as shown in FIG. 18, each spring 45, 46 provides an equal and opposite component of force in a perpendicular direction from the direction of the wheel 54. That is, the force provided by the springs 45, 46 is balanced (i.e. is cancelled out) and so, in the absence of any other force, the wheel 54 is held in the equilibrium position. As the wheel 54 swivels about the swivel axis SA, the force provided by springs 45, 46 becomes unbalanced, as one of the springs is stretch more than the other. This provides a net component of force which acts to swivel the wheel 54 back to the equilibrium position. Therefore, the self-centring mechanism acts to bias the wheel 54 to the equilibrium position when the wheel is in any other position.

In an alternative embodiment, the springs 45, 46 may be attached to a part of the caster 44 or dolly that is configured not to swivel about the swivel axis SA as the wheel's swivel, and the plate 52 may be configured to swivel about the swivel axis SA as the wheel's swivel.

In prior art quarter dollys, the swivel casters are located sufficiently inboard of the quarter dolly such that no orientation of the wheel leads to a part of the wheel protruding past the side of the quarter dolly, i.e. the entire wheel is contained within the perimeter of the prior art quarter dolly. This is to help prevent a quarter dolly from falling off a stack of dollys during a stacking procedure. If a portion of the wheel protrudes over the side of the quarter dolly, and it is placed on top of another quarter dolly, the misaligned wheel may lead to an instability, which could cause the quarter dolly to fall off the stack. However, this leads to narrower tracks (i.e. a shorter distance between the casters), which can result in stability issues when the casters are in use, such as when loaded or being moved around a warehouse. In contrast, by using swivel casters having the self-centring mechanism, the casters can be placed closer to the sides of the dolly as it is known that the wheels will never protrude over the side of the dolly when the dolly is lifted.

In another embodiment, the self-centring mechanism biases the wheel of a swivel caster to one of two positions, depending on how the wheel is orientated when it is lifted off the ground. For example, the self-centring mechanism may bias the wheel to return to the inboard position when the wheel is orientated anywhere less than 90 degrees from the inboard position, and to return to the outboard position when the wheel is orientated anywhere less than 90 degrees from the outboard position. Such an embodiment of a self-centring mechanism is shown in FIGS. 19 and 20.

Figure 19:
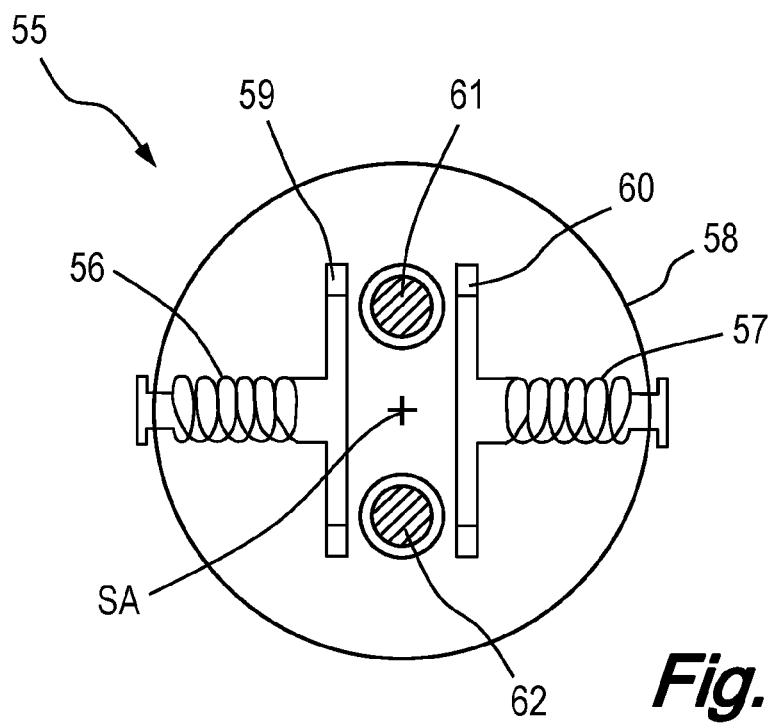
FIG. 19 illustrates a schematical cross-section through a self-centring mechanism in an equilibrium position, according to another embodiment.

FIG. 19 shows a cross section through a swivel caster 55 in the plane perpendicular to a swivel axis SA. The self-centring mechanism comprises two opposing compression springs 56, 57 which are connected to a housing 58 which is fixed with respect to a mounting plate (not shown) of the caster 55, i.e. the housing 58 does not rotate with respect to the dolly when the wheel (not shown) of the swivel caster 55 swivels. One end of each spring 56, 57 is connected to the housing 58, with the other ends being connected to cam surfaces 59, 60 which face one another. The cam surfaces 59, 60 are configured to act on two roller bearings 61, 62. The two roller bearings 61, 62 are positioned either side of the swivel axis SA, and are rotationally fixed with respect to the wheel, such that they rotate about the swivel axis SA as the wheel swivels, i.e. if the wheel is swivelled 90 degrees, the roller bearings 61, 62 are rotated about the SA swivel axis by 90 degrees. While not shown, the roller bearings 61, 62 may be rotationally connected to the wheel via a suitable frame or plate, using, for example, screws. The springs 56, 57 are examples of biasing means.

FIG. 19 shows the self-centring mechanism in an equilibrium position, where the compression springs 56, 57 are in their relaxed state and neither roller bearing 61, 62 is in contact with the cam surfaces 59, 60. There is a small distance either side of the roller bearings 61, 62 to the cam surfaces 59, 60, which leads to a small amount of play in the swivel of the wheel. In an alternative embodiment, the compression springs 56, 57 may be arranged such that they are slightly compressed when in the equilibrium position, i.e. the roller bearings 61, 62 contact the cam surfaces 59, 60 when in the equilibrium position and there is no play in the swivel of the wheel. When in the equilibrium position, there is no net force acting on the roller bearings 61, 62 and there is no net torque acting on the wheel. In the absence of any other force, the wheel remains in the equilibrium position.

Figure 20:
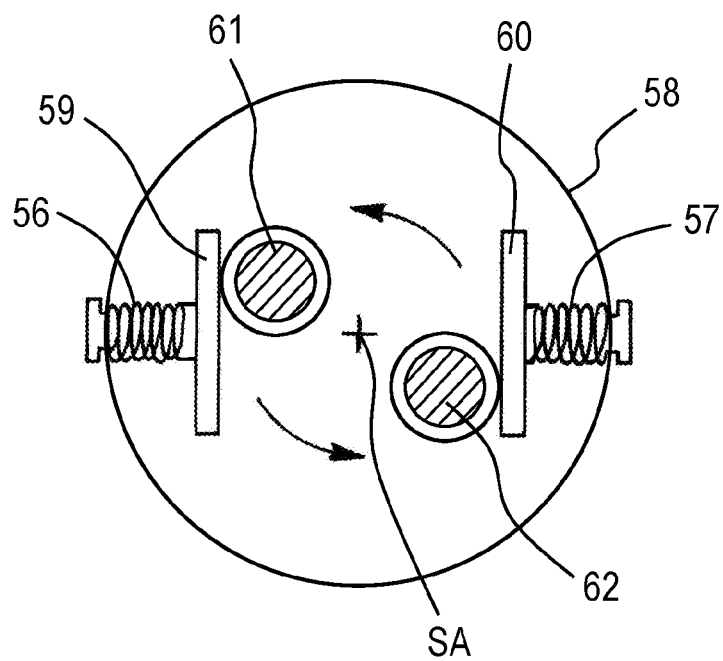
FIG. 20 illustrates a cross-section through the self-centring mechanism of FIG. 19 in a non-equilibrium position.

FIG. 20 shows the self-centring mechanism when the wheel has been rotated about the swivel axis SA. When the wheel is rotated anti-clockwise about the swivel axis SA, the roller bearings 61, 62 are also rotated anti-clockwise about the swivel axis SA. This causes the roller bearings 61, 62 to come into contact with, and act upon, opposite cam surfaces 59, 60. As the springs 56, 57 do not rotate as the wheel swivels, this action causes the springs 56, 57, to be compressed as the roller bearings 61, 62 rotate about the swivel axis SA. Each compressed spring 56, 57 acts upon opposite roller bearings 61, 62, which introduces a net torque into the system, i.e. in the absence of any other force, the wheel will rotate back to the equilibrium position.

The characteristics of the self-centring mechanism (such as the spring strength and relative dimensions of the components) are chosen such that the torque provided to the wheel is weak enough such that it is unable to overcome the friction between the wheel and the ground upon which an unloaded quarter dolly 1 rests, but strong enough such that when the quarter dolly 1 is raised off the ground, the wheel is rotated back into the equilibrium position.

The self-centring mechanism of the embodiment shown in FIGS. 19 and 20 has two equilibrium positions, separated by 180 degrees. When the wheel has been rotated greater than 90 degrees from the equilibrium position shown in FIG. 19, the springs 56, 57 and roller bearings 61, 62 will act to return the wheel to a second equilibrium position which is at 180 degrees from the first equilibrium position.

Knowing that the wheel is either in one position, or one of two positions when the quarter dolly 1 is lifted off the ground improves the efficiency of stacking the quarter dolly 1, as the wheels will either already be in the correct position for being received in corresponding wheel receiving portions or will require rotating by 180 degrees to line up with the wheel receiving portions. Furthermore, the self-centring mechanism also prevents the wheels from swivelling uncontrollably during movement by any MHE, such as when the quarter dolly 1 is lifted off the ground. By preventing such uncontrollable swivelling, the chance of the caster being damaged, or inadvertently damaging the MHE, is reduced. Furthermore, if the wheels are free to swivel and they impact the MHE during handling, the load of the impact can transfer through to a product being carried on the dolly, which can potentially cause the product to topple over and be damaged. Therefore, preventing such uncontrollable swivelling may also protect products being carried by the dolly. Additionally, knowing the orientation of the wheels can reduce the chance of inadvertently damaging the wheels or casters with the MHE, i.e. there is less chance of hitting the wheels of the casters "side on".

The deck 2 comprises a number of reinforcing ribs 63 on the underside 5 of the product support surface 3 which are configured to resist deformation when loaded (see FIG. 8). Aspects of the invention relating to the ribs may be particularly advantageous on the quarter dolly 1 of the present invention for a number of reasons. For example, the increased rigidity provided by the ribs 63 helps offset the reduction in structural integrity of the quarter dolly 1 due to the deeper wheel receiving portions (see above). Furthermore, any flex in the deck 2 of the quarter dolly 1 when a large load is applied may lead to the wheels of the quarter dolly 1 moving apart. This can make the quarter dolly unstable when loaded which can present a health and safety risk. The ribs 63 act to reduce this flex.

The reinforcing ribs 63 extend from the underside 5 of the product support surface 3. At least some of the ribs 63 have the same height as the thickness of the deck. That is, the ribs 63 are arranged not to protrude lower than the sides 4a, 4b of the quarter dolly 1. However, it will be appreciated that the ribs 63 may have a different height than that of the sides and ends 4a, 4b, 4c, 4d. The ribs 63 define cavities 63a between the ribs 63 and or sides and ends 4a, 4b, 4c, 4d of the dolly 1.

The ribs 63 may have an average thickness of about 3 mm. The ribs 63 may be tapered at their ends to facilitate removal of the ribs 63 from a mould during manufacture. The ribs may vary in thickness along the height, or a part of the height, of the rib 63, from between about 3.3 mm to about 2.7 mm. The angle of tapering from the vertical may be between 0.4 and 2 degrees on one or both sides of the ribs 63, and preferably may be around 1.25 degrees on one or both sides of the rib 63.

Some of the reinforcing ribs are curved ribs 64. The term curved refers to a rib that connects two points but not via the shortest path between those points. The curve may be continuous, or may comprise a series of straight sections separated by a series of discrete changes in angle. The discrete changes in angle may each be less than 30 degrees. In another embodiment, the discrete changes in angle may each be less than 20 degrees.

The curved ribs 64 provide increased rigidity to the quarter dolly 1 while using less material than traditional straight ribs. That is, a single curved rib can replace multiple straight ribs while providing adequate protection against deformation, both from side impacts and from loading of the quarter dolly 1. Furthermore, as less material is used in the construction of the quarter dolly 1, the quarter dolly 1 is lighter than prior art quarter dollys. Some of the apertures 27 for drainage and weight saving are also arranged in a curved manner so as to mirror the curvature of the ribs 64. The apertures 27 are arranged such that most cavities 63a defined by the ribs 63 contain at least one aperture 27.

To specifically help to reduce deformation, some of the curved ribs 64 extend between the caster mounting areas 8, 9, 10, 11 of the quarter dolly 1. As can be seen in FIG. 8, curved ribs 64 extend from most of the mounting points of the caster mounting areas, with the exception of the outermost mounting points 8b, 9b, 10b, 11b (due to their location at the outer corners of the quarter dolly 1).

The curved ribs 64 are further particularly advantageous on the quarter dolly 1 of the present invention, because the increased rigidity provided by the curved ribs 64 helps to offset the reduction in structural strength of the quarter dolly 1 due to the deeper wheel receiving portions The mounting plates 12a, 12b, 13a, 13b can also help offset the reduction in structural integrity due to the increased depth of the wheel receiving portions. The mounting plates are typically made from metal, such as steel, and are generally aligned with the wheel receiving portions. However, the mounting points 10, 11 of the swivel casters 7a, 7b are located further inboard (in a lengthwise direction) than the mounting points of the fixed casters. As a result, unlike the fixed caster mounting plates 12a, 12b, the mounting plates 13a, 13b of the swivel casters 7a, 7b do not line up completely with the wheel receiving portions 21a, 21b. Therefore, the regions of the deck 2 containing the wheel receiving portions 21a, 21b for the swivel casters 7a, 7b are provided with more reinforcement than the regions of the deck 2 containing the wheel receiving portions 19a, 19b for the fixed casters 6a, 6b.

In an embodiment, this extra reinforcement is provided by providing more ribs 63, 64 extending from the mounting points of the swivel casters when compared with their respective mounting points on the fixed casters. For example, FIG. 8 shows that the innermost mounting points 10d, 11d for the swivel casters 7a, 7b, have eight ribs which extend therefrom. As the swivel casters are located further inboard (lengthways) than the fixed casters (see FIG. 13), providing an increased number of ribs from the inner most mounting points 10d, 11d of the swivel casters provides greater resistance to deformation in the region of the swivel casters. In contrast, the inner most mounting points 8d, 9d for the fixed casters 6a, 6b, do not require as many extending ribs, and in the embodiment shown in FIG. 8, have six ribs which extend therefrom. Similarly, there are a greater number of ribs extending from the mounting points 10c, 11c of the swivel casters than there are for the mounting points 8c, 8d, for the fixed casters. In the embodiment shown in FIG. 8, mounting points 10c, 11c of the swivel casters have six ribs extending therefrom, whereas mounting points 8c, 9c of the fixed casters have five ribs extending therefrom.

The angle differs between each of the extending ribs from the inner most mounting points (for both the swivel casters and fixed casters). The angles between the ribs that extend towards the centre of the quarter dolly 1 are generally smaller than the angles between the ribs that extend away from the centre of the quarter dolly 1. For example, two ribs extend from inner most mounting point 10d in a first quadrant FQ (not including ribs aligned with the axis of the quadrant), where the first quadrant has an origin located at inner most mounting point 10d, and encompasses the centre of the dolly 1. In contrast, only one rib extends from inner most mounting point 10d in a second quadrant SQ (where the second quadrant has an origin located at inner most mounting point 10d, and encompasses the outer corner of the dolly 1 closest to the inner mounting point 10d). This is also true for the other mounting points 8a, 8c, 9a, 9c, 10a, 10c, 11a, 11c not located at the outer corners. In an embodiment, more than two ribs may extend into the first quadrant FQ from mounting point 10d, and no ribs may extend from into the second quadrant SQ from the mounting point 10d.

Figure 13:
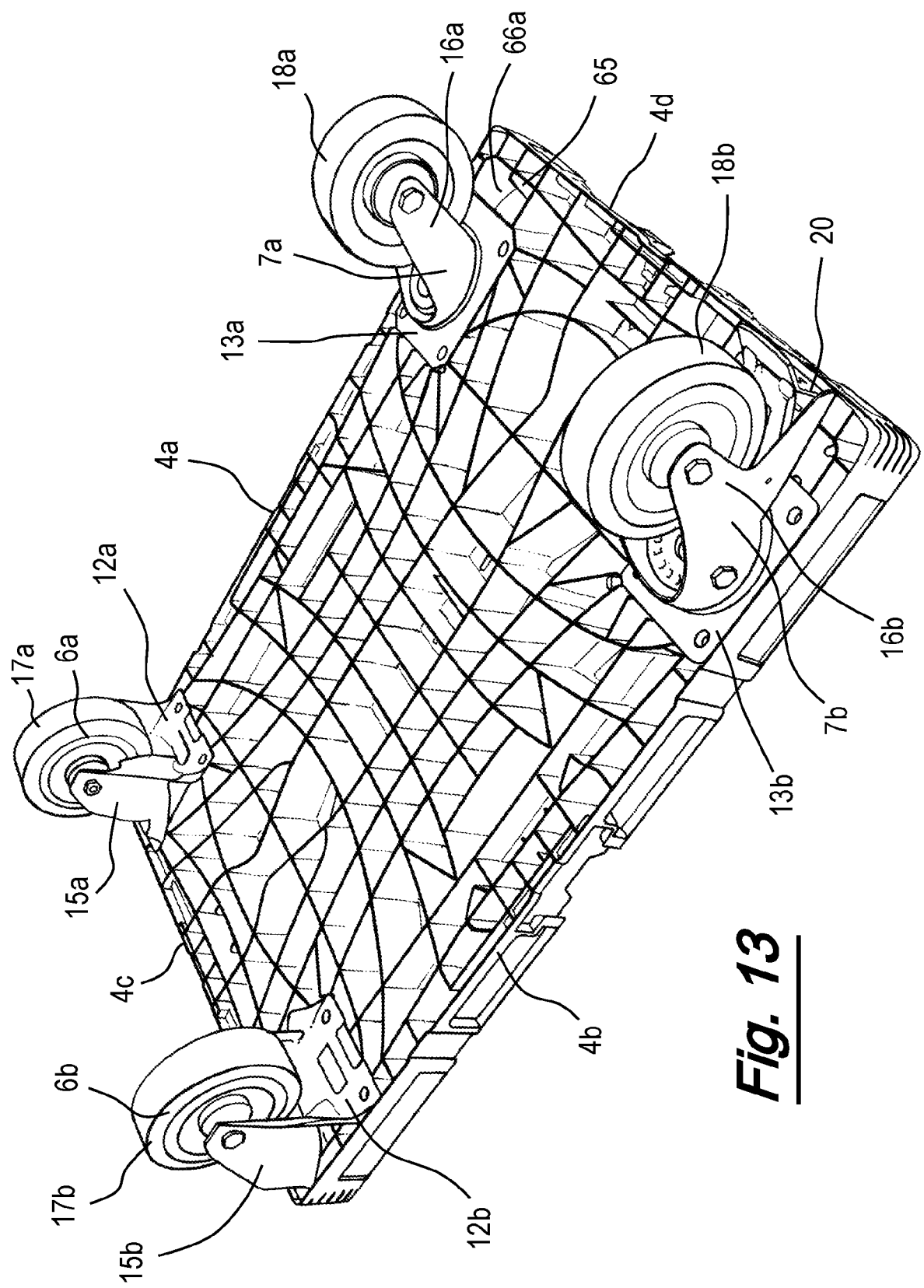
FIG. 13 illustrates a perspective view of the underneath of a quarter dolly.

In another embodiment, further reinforcement of the area around the wheel receiving portions 21a, 21b for the swivel casters 7a, 7b, is provided by arranging an additional rib 65 under each wheel receiving portion 21a, 21b, which extends from the front end 4d of the quarter dolly 1 and terminates within the recess 66a, 66b, which is located under a part of the wheel receiving portion. The additional rib 65 is arranged to extend, at least partially, under the wheel receiving portion 21a, 21b, and is configured to help reduce stress during an impact on the front 4d of the quarter dolly 1. That is, the additional rib 65 has a first end connected to another rib 63, and a second end which does not connect to another rib 65, i.e. terminates within the recess 66a, 66b. The second end may be tapered, as can be seen in FIG. 13.

The additional rib 65 may be relatively short when compared with the length of the recess 66a, 66b, thus saving weight. In an embodiment, the additional rib 65 may be curved. In a further embodiment, the additional rib 65 may extend fully within the recess 66a, 66b, and may alternatively extend over the total length of the wheel receiving pockets 21a, 21b.

As can be seen in FIG. 8, towards the rear end 4c of the dolly 1 (where rear end is defined as a side where the fixed casters 6a, 6b are located), a first curved rib 67 extends between mounting points 8d and 9d, curving towards the rear end 4c. A second curved rib 68, having a shallower curve, and which curves away from the rear end 4c, extends between mounting points 8a and 9a. A third curved rib 69 extends between mounting points 8c and 9c, which curves away from the rear end 4c.

Towards the front 4d of the dolly 1 (where front is defined as a side where the swivel casters 7a, 7b are located), a fourth curved rib 70 extends between mounting points 10d and 11d. A fifth curved rib 71, having a shallower curve, and which curves in an opposite direction to the fourth curved rib 70, extends between mounting points 10a and 11a. A sixth curved rib 72 extends between mounting points 10c and 11c.

In other words the mounting points 8a, 8c, 8d, 9a, 9c, 9d, 10a, 10c, 10d, 11a, 11c, 11d, which are not located at the outer corners of the quarter dolly 1 are all connected widthways to their corresponding mounting points 8a, 8c, 8d, 9a, 9c, 9d, 10a, 10c, 10d, 11a, 11c, 11d, via at least one curved rib.

Mounting point 10d is also directly connected to mounting point 11d via a straight rib 73. A straight rib is not required between mounting points 8d, 9d of the fixed casters as the curve of the first curved rib 67 is sufficiently shallow. However, the fourth curved rib 70 connecting corresponding mounting points 10d, 11d is deeper, as the mounting points 10d, 11d are located a greater distance from the front end 4d of the quarter dolly 1 than the distance between mounting points 8d, 9d and the rear 4c of the quarter dolly 1. Therefore, the additional straight rib 73 helps provide further rigidity between the swivel caster mounting points 10d, 11d.

The mounting points 8a, 8c, 8d, 9a, 9c, 9d, 10a, 10c, 10d, 11a, 11c, 11d, which are not located at the outer corners of the quarter dolly 1 are also connect to their corresponding mounting points lengthways. Mounting point 8a is connected to mounting point 11a via a seventh curved rib 74. Mounting point 9a is connected to mounting point 10a via an eighth curved rib 75. Mounting point 8d is connected to mounting point 11d via a ninth curved rib 76. Mounting point 9c is connected to mounting point 10c via a tenth curved rib 77. Mounting point 9d is connected to mounting point 10d via an eleventh curved rib 78. Mounting point 8c is connected to mounting point 11c via a twelfth curved rib 79.

The ribs 63 and curved ribs 64 are configured such that there is a greater concentration of ribs in areas where there will likely be higher stress, such as towards the centre of the quarter dolly 1. There is also a greater concentration of ribs at the sides 4a, 4b and ends 4c, 4d of the quarter dolly 1 to help protect the quarter dolly 1 against impacts. The curved ribs 64 are also configured to curve around the location of fixed features, such as the handle holes 30 or slots 33.

At least one curved rib 76-79 extends between a caster mounting area 8, 9 at one end 4c of the quarter dolly 1 and a caster mounting area 10, 11 at an opposite end 4d of the quarter dolly. This arrangement of ribs may improve the strength of the quarter dolly. The at least one curved rib may extend between mounting points of the caster mounting areas.

The handle holes 30 in particular present an area of reduced structural integrity along the length of the quarter dolly 1. Therefore, the use of a number of curved ribs 64 in the area of the handle holes 30 helps to offset this reduction in structural integrity along the sides 4a, 4b of the quarter dolly 1.

Figure 24:
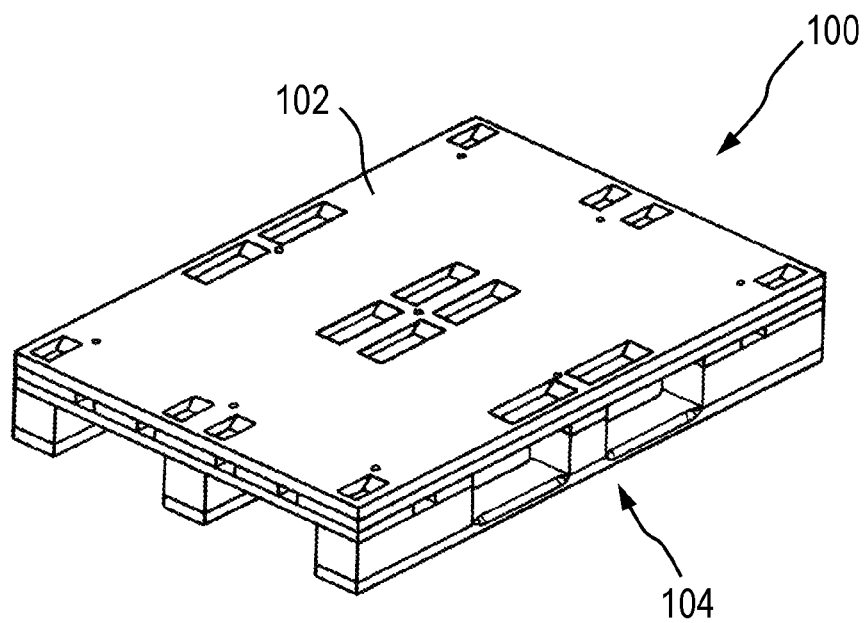
FIGS. 24 and 25 depict a dolly carrier pallet according to an embodiment of the invention.

FIG. 24 is a perspective view of a dolly carrier pallet 100 according to an embodiment of the invention. The dolly carrier pallet 100 may be used to transport dollies according to embodiments of the invention. The dolly carrier pallet 100 is particularly suited to transportation of dollies with self-centering swivel casters.

Figure 25:
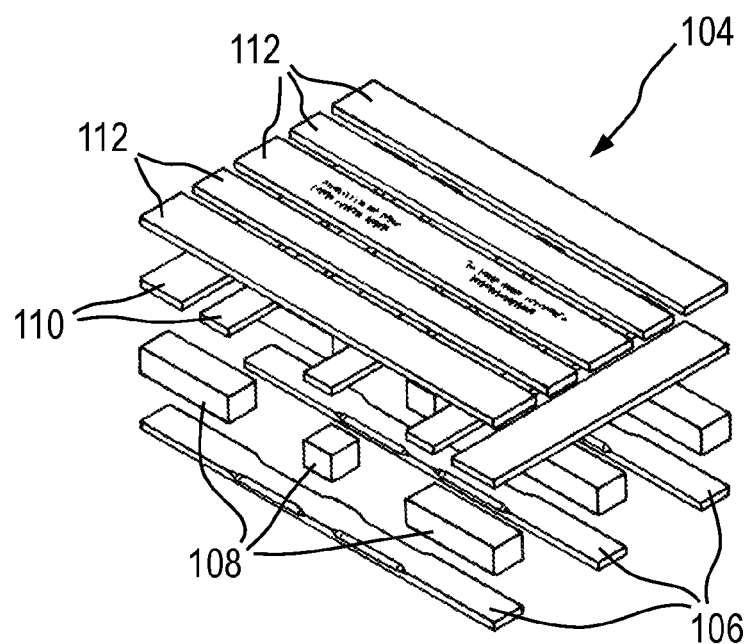

The dolly carrier pallet 100 comprises a dolly receiving layer 102 provided on top of a pallet 104. The pallet 104 is depicted in an exploded view in FIG. 25. As may be seen in FIG. 25, the pallet 104 comprises three length-ways extending planks 106, a plank provided at either side of the pallet and a plank running along the middle of the pallet. These planks form a base of the pallet. Blocks 108 are provided on the planks 106 and in turn support width-ways extending planks 110. Finally, five length-ways extending planks 112 are provided on top of the width-ways extending planks 110. The planks 106, 110, 112 may be formed from wood. Similarly, the blocks 108 may be formed from wood. The planks and blocks may for example be secured together using nails or screws.

The blocks 108 which are located at corners of the pallet 104 are longer than is conventionally the case. For example, the blocks may have a length of 200 mm or more, and may have a length of 250 mm or more. The blocks may for example be around 300 mm in length. Providing the blocks with increased length improves the stability of the dolly receiving layer 102 when it is being used to transport stacks of dollies (less flexing of the dolly receiving layer will occur).

Figure 26:
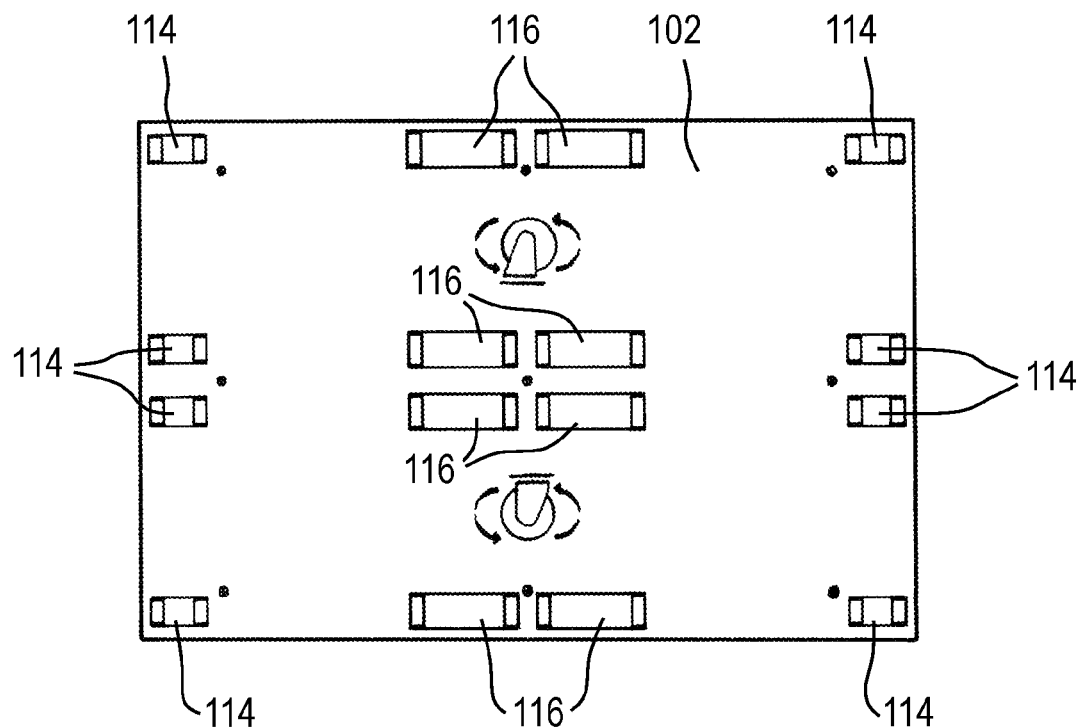
FIGS. 26 and 27 depict a dolly receiving layer of the dolly carrier pallet.
Figure 27:
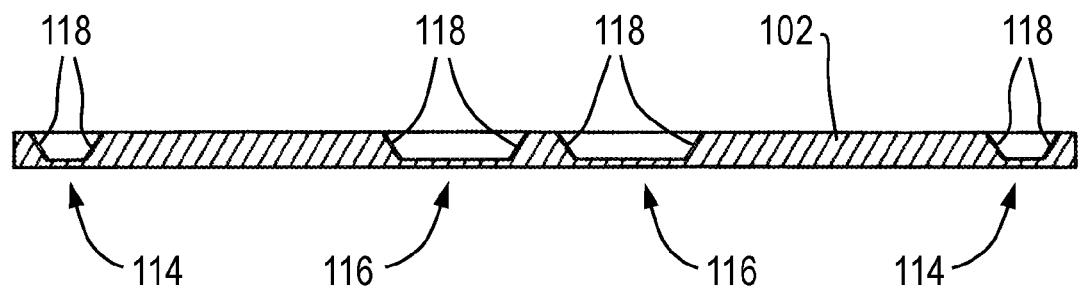
Figure 28:
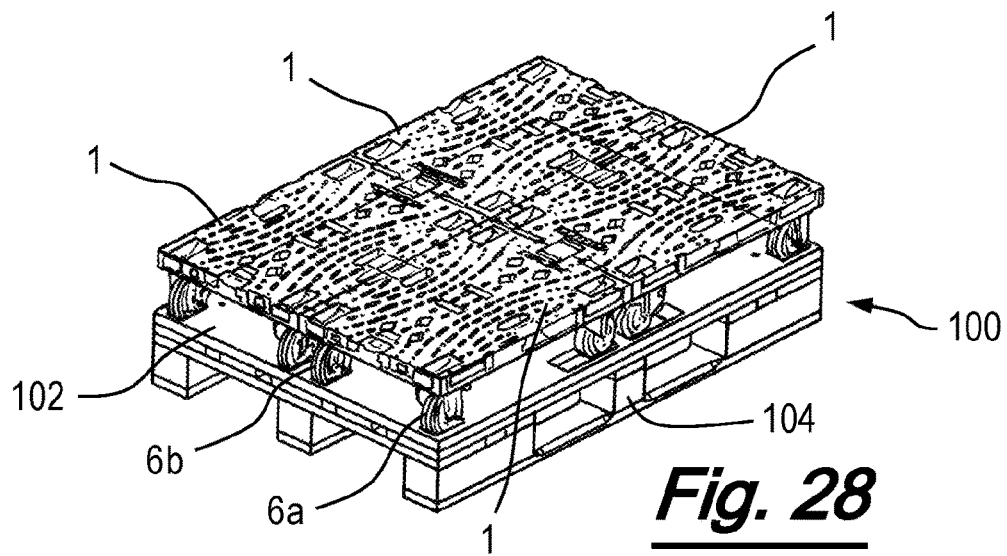
FIGS. 28 to 30 illustrate the dolly carrier pallet with dollies positioned on it.
Figure 29:
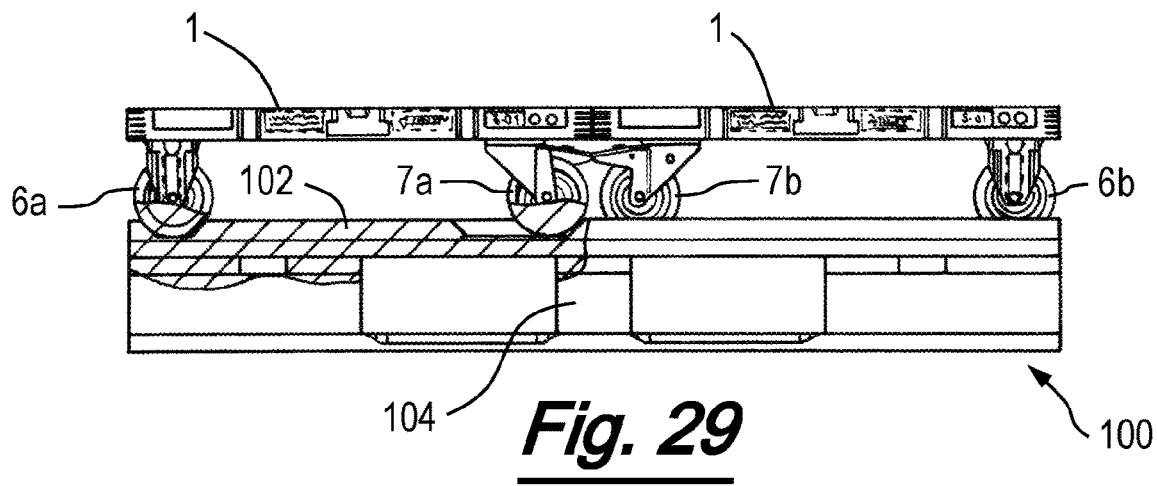
Figure 30:
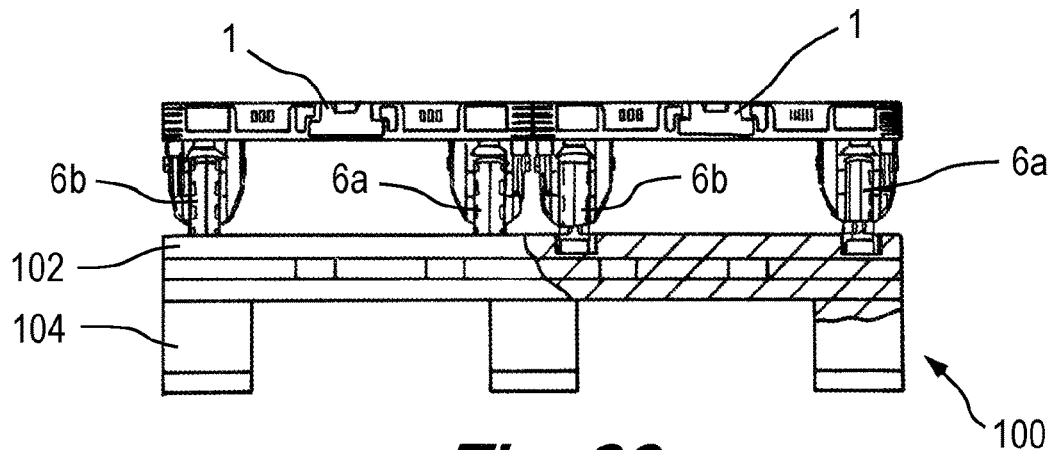

FIG. 26 depicts the dolly receiving layer 102 viewed from above, and FIG. 27 depicts the dolly receiving layer 102 in cross-section. Wheel receiving recesses 114, 116 are provided in the dolly receiving layer 102. The wheel receiving recesses 114, 116, which may also be referred to as wheel recesses, are configured to allow four quarter dollies 1 to be received on the dolly receiving layer 102. This is depicted in FIGS. 28-30. The wheel receiving recesses 114, 116 extend through the majority of the thickness of the dolly receiving layer 102 but do not penetrate through the bottom of the dolly receiving layer. The dolly receiving layer 102 may be secured to the pallet 104 using screws. Any other suitable securing means may be used (e.g. nails).

The wheel receiving recesses 114, 116 are all rectangular in form when viewed from above. A chamfer 118 is provided at either end of each wheel receiving recess 114, 116. The illustrated chamfer 118 is at 45 degrees, but other angles of chamfer may be used. Wheel receiving recesses 114 which are provided at ends of the dolly receiving layer 102 are shorter than wheel receiving recesses 116 which are provided towards the centre of the dolly receiving layer. The wheel receiving recesses 114 at the ends of the dolly receiving layer 102 are configured to receive fixed casters of quarter dollies (i.e. casters which are not swivel casters). The casters may for example be casters 6a, 6b as depicted and described elsewhere in this document. The wheel receiving recesses 116 provided towards the centre of the dolly receiving layer 102 are longer than wheel receiving recesses 114 provided at the ends of the dolly receiving layer. The wheel receiving recesses 116 provided towards the centre of the dolly receiving layer 102 are configured to receive swivel casters of quarter dollies. The swivel casters may for example be swivel casters 7a, 7b as depicted and described elsewhere in this document.

As has been explained further above, the swivel casters of a quarter dolly may include a self-centering mechanism such that when the quarter dolly is lifted from the ground the swivel casters move to one of two positions. In both positions the wheels of the swivel casters may be substantially parallel to an edge of the quarter dolly. In a first position, which may be referred to as an outboard position, the axis of the wheel of the caster is closer to an adjacent end of the quarter dolly than to a swivel axis of the caster. An example of the outboard position is depicted in FIG. 9. In the other position, which may be referred to as in the inboard position, the axis of the wheel is closer to the centre of the quarter dolly then the swivel axis of the caster. An example of the inboard position is depicted in FIG. 10. The wheel receiving recesses 116 are capable of receiving swivel casters in the inboard position and are also capable of receiving swivel casters in the outboard position (the length of the wheel receiving recess 116 is significantly greater than the diameter of a wheel of the quarter dolly).

The wheel receiving recesses 114 at the ends of the dolly receiving layer 102 have a length which is less than the diameter of a dolly wheel. The length of these wheel receiving recesses 114 may generally correspond with the length of a portion of the wheel that will be received in the wheel recess. Thus, there is a snug fit between the wheel 6a, 6b and the wheel receiving recess 114 (see FIG. 29) such that significant movement of the wheel along the wheel receiving recess is prevented. The snug fit may alternatively be referred to as a close fit. The wheel receiving recesses 114 at the ends of the dolly receiving layer 102 accurately position the quarter dolly in a length-wise direction. This ensures that four quarter dollies can be placed on the dolly receiving layer (it prevents a dolly from overlapping with a space that should be available to receive a different dolly).

The wheel receiving recesses 116 towards the centre of the dolly receiving layer 102 are longer than the wheel receiving recesses 114 at the ends of the dolly receiving layer. These wheel receiving recesses 116 may have a length which is greater than twice the distance between the wheel axis and the swivel axis of a caster (e.g. greater than 80 mm). The wheel receiving recesses 116 towards the centre of the dolly are sufficiently long to receive swivel casters in the inboard position or in the outboard position.

The wheel receiving recesses 116 towards the centre of the dolly receiving layer 102 may have widths which are greater than wheel receiving recesses 114 at the ends of the dolly receiving layer (e.g. at least 5 mm greater, e.g. 10 mm or more greater). This greater width allows a swivel caster to be received which has an inboard or outboard position which is not fully parallel with the side of its dolly. This may for example be due to damage or wear of the caster during use.

The wheel receiving recesses 114 at the ends of the dolly receiving layer 102 have a width which is slightly bigger than the width of the fixed caster wheels (e.g. bigger by up to 10 mm). These wheel receiving recesses 114 ensure that the quarter dollies are accurately positioned width-wise when they are placed upon the dolly receiving layer 102, and thus ensures that four quarter dollies can be accommodated on the dolly receiving layer. If the width-wise location of a quarter dolly was not accurately controlled by the wheel receiving recesses 114, 116 then a dolly already located on the dolly receiving layer 102 may overlap with a space which should be occupied by another dolly and may prevent that dolly from being loaded on to the dolly receiving layer.

As noted above, ends of the wheel receiving recesses 114, 116 may include a chamfer 118. A chamfer is desirable because it allows a quarter dolly to move into the wheel receiving recesses 114, 116 in the event that a dolly is slightly misplaced on the dolly receiving layer 102 in a length-wise direction.

FIGS. 28-30 depict four quarter dollies 1 positioned on the dolly carrier pallet 100. Casters of each of the four dollies 1 are received by the dolly carrier pallet 100. In these figures the swivel casters are all in the outboard position. However, in practice some or all of the swivel casters may be in the inboard position.

The wheel receiving recesses 114 for the fixed casters may for example have a width of less than 50 mm (e.g. around 44 mm). These wheel receiving recesses may for example have a length of less than 100 mm (e.g. less than 90 mm, e.g. more than 80 mm) including the chamfered portions. The non-chamfered portion of these wheel receiving recesses 114 may for example have a length of less than 60 mm (e.g. less than 50 mm, e.g. more than 40 mm).

The wheel receiving recesses 116 for the swivel casters may for example have a width greater than 50 mm (e.g. around 54 mm). These wheel receiving recesses 116 may for example have a length of more than 150 mm (e.g. more than 160 mm, e.g. less than 170 mm) including the chamfered portion. The non-chamfered portion of these wheel receiving recesses 116 may for example have a length greater than 110 mm (e.g. more than 120 mm, e.g. less than 140 mm).

The wheel receiving recesses 114, 116 may for example have a depth of 15 mm or more. The wheel receiving recesses may for example have a depth of around 20 mm.

The dolly receiving layer 102 may be formed from wood, for example plywood. The plywood may for example be marine grade plywood. Alternatively, the dolly receiving layer 102 may be formed from plastic or any other suitable material.

As may be seen from FIG. 27, the wheel receiving recesses 114, 116 are recesses rather than openings which pass through the dolly receiving layer 102. In an alternative embodiment the wheel receiving recesses may pass fully through the dolly receiving layer 102. However, advantages arise from the wheel receiving recesses not passing fully through the dolly receiving layer. Specifically, the wheel receiving recesses 114, 116 have a bottom surface onto which wheels of the dolly can rest. This provides improved stability of the dolly on the dolly carrier pallet 100 (compared with if the dolly wheels were resting on the planks 112 of the pallet which may not be a smooth surface and/or which may not be flat). The bottom surfaces of the wheel receiving recesses 114, 116 may be flat.

Although in the described and illustrated embodiment of the invention the wheel recesses 114 which receive fixed casters are at the ends of the dolly receiving layer 102, in an alternative embodiment they may be located towards the centre of the dolly receiving layer. Similarly, although in the described and illustrated embodiment of the invention the wheel recesses 116 which receive swivel casters are located towards the centre of the dolly receiving layer 102, in an alternative embodiment they may be located at the ends of the dolly receiving layer. In a further alternative embodiment, some wheel receiving recesses 114 which receive fixed casters may be at ends of the dolly receiving layer 102 and other wheel receiving recesses 114 which receive fixed casters may be towards the centre of the dolly receiving layer.

An advantage of providing the wheel recesses 116 which receive swivel casters towards the centre of the dolly receiving layer 102, is that brakes of the swivel casters do not project outwards at an outer edge of the dolly carrier pallet 100 (see FIG. 29). If the brakes were to project at an outer edge of the dolly carrier pallet 100 then they might snag on people or objects. Although the brakes in FIG. 29 appear to be touching, in practice only one swivel caster is provided with a brake, and consequently brakes of the swivel casters are offset relative to each other in the width-wise direction of the dolly carrier pallet 100.

As noted further above, the wheel receiving recesses 114, 116 are rectangular in form when viewed from above. The wheel receiving recesses 114, 116 may be referred to as being generally rectangular. A shape which includes a small deviation from a rectangle may be considered to be generally rectangular. The generally rectangular wheel receiving recesses should be sufficiently close to a rectangle that they are not capable for example of receiving a swivel caster which is at 45 degrees relative to a side of a dolly. Thus for example the wheel receiving recesses do not include a semi-circular shape to accommodate a swivel caster at such an angle. The wheel receiving recesses 116 are thus configured to receive swivel casters which are biased towards equilibrium positions in which the wheels are oriented along the length of the dolly.

In the illustrated embodiment of the dolly carrier pallet 100 the recesses 116 which receive swivel casters 7a,b are sufficiently long to receive swivel casters in the inboard position or in the outboard position (these are examples of equilibrium positions). However, as described further above in connection with FIG. 18, the swivel casters may be configured such that they have only one equilibrium position (e.g. the outboard position). Where this is the case the length of the swivel caster receiving recesses may accordingly be shorter. The length of the swivel caster receiving recesses may for example generally be the same as the length of the fixed caster receiving recesses. However, it may be preferred for the recesses 116 which receive swivel casters 7a,b to be sufficiently long to receive swivel casters in the inboard position or the outboard position (e.g. as illustrated). This is beneficial because it allows the dolly carrier pallet 100 to receive dollies with swivel casters which may have the inboard position or the outboard position as well as receiving swivel casters which may have only one equilibrium position (e.g. the outboard position).

It will be appreciated by the person of skill in the art that various modifications may be made to the above described embodiment without departing from the scope of the present invention. The person of skill in the art will also realise that where appropriate, suitable parts of any of the embodiments may be used with other embodiments.

The invention claimed is:

1. A dolly for transporting products thereon, the dolly comprising:
    a top with a product support surface and an opposing underside;
    a plurality of casters provided on the underside, two of the casters being swivel casters configured to rotate relative to the product support surface; and
    biasing means configured to bias a wheel of each swivel caster towards a first equilibrium position or towards a second equilibrium position based on orientation of the wheel while the wheel is not in contact with the ground, with the first equilibrium position having an inboard direction and the second equilibrium position having an outboard direction that is opposite the inboard direction.

2. The dolly as in claim 1, wherein two of the casters have a fixed orientation relative to the product support surface.

3. The dolly as in claim 1, wherein the first and second equilibrium positions are separated by 180 degrees.

4. The dolly as in claim 1, wherein the first orientation is an orientation of the wheel being less than 90 degrees from the first equilibrium position.

5. The dolly as in claim 1, wherein the second orientation is an orientation of the wheel being less than 90 degrees from the second equilibrium position.

6. The dolly as in claim 1, further comprising four wheel receiving portions arranged in the product support surface, each wheel receiving portion being configured to receive a wheel from a further dolly, wherein the depth of the wheel receiving portion is greater than 15 mm.

7. The dolly as in claim 6, wherein at least one wheel receiving portion is substantially aligned with a corresponding at least one caster mounting area.

8. The dolly as in claim 1, wherein the dolly is a quarter dolly.

9. The dolly as in claim 1, wherein at least one of the swivel casters comprises a brake mechanism which can be actuated in order to prevent rotation of the wheel of the at least one swivel caster.

10. A dolly for transporting products thereon, the dolly comprising:
    a top having a front end and an opposing rear end, and with the top having a product support surface and an opposing underside; and
    a plurality of curved reinforcing ribs provided on the underside and extending from a first caster mounting area to a second caster mounting area, with the plurality of curved reinforcing ribs comprising:
      a first curved rib curving towards the rear end of the top, and
      a second curved rib curving towards the front end of the top.

11. The dolly as in claim 10, wherein the first caster mounting area comprises a first mounting point which receives a fixing means to affix a first caster, and the second caster mounting area comprises a second mounting point which receives a fixing means to affix a second caster.

12. The dolly as in claim 11 wherein the at least one curved reinforcing rib extends between the first mounting point and the second mounting point.

13. The dolly as in claim 10, further comprising third and fourth caster mounting areas, and wherein each caster mounting area is connected to at least two other caster mounting areas via at least one curved rib.

14. A combination of a dolly carrier pallet and a dolly, wherein the dolly comprises a top with a product support surface and an opposing underside, a plurality of casters being provided on the underside, two of the casters being swivel casters configured to rotate relative to the product support surface, the dolly further comprising biasing means configured to bias a wheel of each swivel caster towards a first equilibrium position or towards a second equilibrium position based on orientation of the wheel while the wheel is not in contact with the ground, with the first equilibrium position having an inboard direction and the second equilibrium position having an outboard direction that is opposite the inboard direction; and wherein the dolly is located on the dolly carrier pallet, the dolly carrier pallet having a dolly receiving layer provided with generally rectangular recesses which receive the casters of the dolly.

15. The dolly and dolly carrier pallet combination of claim 14, wherein two of the casters of the dolly have a fixed orientation relative to the product support surface, and wherein the recesses which receive the swivel casters are wider than the recesses which receive the fixed casters.

16. The dolly and dolly carrier pallet combination of claim 15, wherein the recesses which receive the swivel casters are located towards the centre of the dolly carrier pallet and the recesses which receive the fixed casters are located at ends of the dolly carrier pallet, such that the swivel casters are located towards the centre of the dolly carrier pallet.

17. The dolly and dolly carrier pallet combination of claim 15, wherein there is a close fit between the fixed casters and the recesses which receive the fixed casters such that significant movement of the fixed casters along those recesses is prevented.

18. The dolly and dolly carrier pallet combination of claim 15, wherein the dolly carrier pallet is provided with sixteen generally rectangular recesses, each receiving a caster of a dolly such that four dollies are received by the dolly carrier pallet.

\* \* \* \* \*